United States Patent
Yang et al.

(10) Patent No.: US 9,717,026 B2
(45) Date of Patent: Jul. 25, 2017

(54) COOPERATIVE COMMUNICATION PROCESSING METHOD, ENB, AND SYSTEM

(71) Applicant: HUAWEI TECHNOLOGIES CO., LTD., Shenzhen (CN)

(72) Inventors: Fei Yang, Shenzhen (CN); Yue Li, Shenzhen (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 14/695,226

(22) Filed: Apr. 24, 2015

(65) Prior Publication Data

US 2015/0230142 A1  Aug. 13, 2015

Related U.S. Application Data

(63) Continuation of application No. PCT/CN2012/083441, filed on Oct. 24, 2012.

(51) Int. Cl.
*H04W 36/00* (2009.01)
*H04W 76/06* (2009.01)
(Continued)

(52) U.S. Cl.
CPC ....... *H04W 36/0083* (2013.01); *H04W 36/00* (2013.01); *H04W 36/245* (2013.01); *H04W 36/38* (2013.01); *H04W 76/06* (2013.01)

(58) Field of Classification Search
None
See application file for complete search history.

(56) References Cited

U.S. PATENT DOCUMENTS

| 2005/0232212 A1* | 10/2005 | Kang | H04W 36/0061 370/338 |
| 2008/0108350 A1* | 5/2008 | Hamasaki | H04W 36/08 455/436 |

(Continued)

FOREIGN PATENT DOCUMENTS

| CN | 101370301 | 2/2009 |
| CN | 101686563 | 3/2010 |

(Continued)

OTHER PUBLICATIONS

International Search Report mailed Aug. 1, 2013 in corresponding international application PCT/CN2012/083441.
PCT International Search Report dated Aug. 1, 2013 in corresponding International Patent Application No. PCT/CN2012/083441.

*Primary Examiner* — Gary Mui
(74) *Attorney, Agent, or Firm* — Staas & Halsey LLP

(57) ABSTRACT

Embodiments of the present invention provide a cooperative communication processing method, the method includes: acquiring report information of a first communication device, where the first communication device is a supporting device or a benefited device; and if it is determined, according to the report information of the first communication device, that the first communication device needs to perform a communication handover, executing the following steps: sending a connection configuration message to the first communication device, so that the first communication device releases a cooperative bearer context between the first communication device and a source eNB; and sending a connection configuration message to a second communication device. According to the present invention, release or maintenance processing of a cooperative relationship between cooperative communication devices in a communication handover process can be implemented.

13 Claims, 10 Drawing Sheets

(51) Int. Cl.
*H04W 36/24* (2009.01)
*H04W 36/38* (2009.01)

(56) References Cited

U.S. PATENT DOCUMENTS

| | | | |
|---|---|---|---|
| 2010/0027507 A1 | 2/2010 | Li et al. | |
| 2010/0061339 A1* | 3/2010 | Kim | H04W 36/0005 370/331 |
| 2010/0087196 A1* | 4/2010 | Lee | H04W 60/06 455/436 |
| 2010/0103845 A1* | 4/2010 | Ulupinar | H04L 29/12207 370/254 |
| 2012/0140700 A1* | 6/2012 | Huang | H04W 36/12 370/315 |
| 2012/0190368 A1* | 7/2012 | Zhang | H04W 36/0055 455/436 |
| 2012/0229942 A1* | 9/2012 | Hussein | H03K 17/0828 361/57 |
| 2013/0324114 A1* | 12/2013 | Raghothaman | H04W 76/023 455/426.1 |
| 2014/0179330 A1* | 6/2014 | Du | H04W 76/043 455/450 |

FOREIGN PATENT DOCUMENTS

| | | |
|---|---|---|
| CN | 101835172 | 9/2010 |
| CN | 101986761 | 3/2011 |
| CN | 102186215 | 9/2011 |

\* cited by examiner

COOPERATIVE COMMUNICATION PROCESSING METHOD, ENB, AND SYSTEM

CROSS-REFERENCE TO RELATED APPLICATIONS

This application is a continuation of International Application No. PCT/CN2012/083441, filed on Oct. 24, 2012, which is hereby incorporated by reference in its entirety.

TECHNICAL FIELD

The present invention relates to wireless communications technologies, and in particular, to a cooperative communication processing method, eNB, and system.

BACKGROUND

With rapid development of mobile communications technologies, generally a mobile communication system can provide data communication services in addition to basic voice communication services. A user equipment may use the data communication services, which are provided by the mobile communication system, to upload and download various kinds of data. However, generally existing manners of mobile communication services are all to perform data transmission for a single user equipment. Even if other enhanced communication means are used to increase reliability and/or a throughput rate of data transmission of a user equipment, for example, coordinated multipoint transmission (CoMP) is used to increase reliability of data transmission of a user equipment located at a cell edge, and carrier aggregation (CA) is used to increase a throughput rate of the user equipment, operations are still targeted at a single user equipment. When an environment of a user equipment deteriorates, a throughput rate and/or reliability of data transmission of the user equipment decreases dramatically.

To solve the foregoing problem, a concept of cooperative communication, namely, cooperative communication between a single network node and multiple users, which is also referred to as multi-user cooperative communication (MUCC), is put forward. In a cooperative communication architecture, data sent by an eNB (evolved Node B) to a UE (user equipment) may be first sent to another UE near to the UE, and then forwarded to a final destination UE by using a short-range communications technology between the UEs. In this way, a UE having a best channel condition may be selected from several UEs for delivery, to achieve an effect of multi-user diversity. Existing cooperative communication has the following disadvantages: In a cooperative communication process, a UE (benefited UE or supporting UE) may need to be handed over to a new eNB due to deterioration of a channel condition or other reasons, and in this case, an existing cooperative communication relationship cannot be released or maintained during the handover in the prior art.

SUMMARY

Embodiments of the present invention provide a cooperative communication processing method, eNB, and system, which may implement release or maintenance processing of a cooperative communication relationship between cooperative communication devices in a communication handover process.

According to a first aspect, an embodiment of the present invention provides a cooperative communication processing method, where the method includes:

acquiring report information of a first communication device, where the first communication device is a supporting device or a benefited device; and if it is determined, according to the report information of the first communication device, that the first communication device needs to perform a communication handover, executing the following steps:

sending a connection configuration message to the first communication device, so that the first communication device releases a cooperative bearer context between the first communication device and a source eNB; and sending a connection configuration message to a second communication device, so that the second communication device releases a cooperative bearer context between the second communication device and the first communication device and a cooperative bearer context between the second communication device and the source eNB, where the second communication device is a cooperative communication device of the first communication device.

In a first possible implementation manner of the first aspect, after it is determined, according to the report information of the first communication device, that the first communication device needs to perform the communication handover, and before the sending a connection configuration message to the first communication device, the method further includes:

confirming that all bearer contexts of the first communication device are cooperative bearer contexts.

In a second possible implementation manner of the first aspect, after it is determined, according to the report information of the first communication device, that the first communication device needs to perform the communication handover, and before the sending a connection configuration message to the first communication device, the method further includes:

confirming that a bearer context of the first communication device includes a non-cooperative bearer context;

sending a handover request message to a handover target eNB of the first communication device, where the handover request message includes a first bearer context between the source eNB and the first communication device, and the first bearer context includes a non-cooperative bearer context between the source eNB and the first communication device; and receiving a handover acknowledge message from the handover target eNB of the first communication device, where the handover acknowledge message includes a second bearer context that is allocated to the first communication device according to the first bearer context by the handover target eNB of the first communication device; and the sending a connection configuration message to the first communication device includes:

sending the connection configuration message to the first communication device, where the connection configuration message carries the second bearer context that is allocated to the first communication device by the handover target eNB of the first communication device, so that the first communication device initiates a random access procedure to the handover target eNB of the first communication device according to the second bearer context that is allocated to the first communication device by the handover target eNB of the first communication device.

With reference to the second possible implementation manner of the first aspect, in a third possible implementation manner, the first bearer context further includes the cooperative bearer context between the source eNB and the first communication device.

In a fourth possible implementation manner of the first aspect, before the sending a connection configuration message to the first communication device, the method further includes:

sending a handover request message to a handover target eNB of the first communication device, where the handover request message includes a first bearer context between the source eNB and the first communication device, and the first bearer context includes the cooperative bearer context and a non-cooperative bearer context between the source eNB and the first communication device; and receiving a handover acknowledge message from the handover target eNB of the first communication device, where the handover acknowledge message includes a second bearer context that is allocated to the first communication device according to the first bearer context by the handover target eNB of the first communication device; and the sending a connection configuration message to the first communication device includes:

sending the connection configuration message to the first communication device, where the connection configuration message carries the second bearer context that is allocated to the first communication device by the handover target eNB of the first communication device, so that the first communication device initiates a random access procedure to the handover target eNB of the first communication device according to the second bearer context that is allocated to the first communication device by the handover target eNB of the first communication device.

With reference to the second or fourth possible implementation manner of the first aspect, in a fifth possible implementation manner, before the sending a connection configuration message to a second communication device, the method further includes:

after the handover acknowledge message is received from the handover target eNB of the first communication device, when a first time interval reaches a threshold, confirming that the second communication device is still served by the source eNB.

With reference to the second or fourth possible implementation manner of the first aspect, in a sixth possible implementation manner, the handover acknowledge message further includes a eNB identifier of the handover target eNB of the first communication device and a radio network temporary identifier that is allocated to the first communication device by the handover target eNB of the first communication device, and the method further includes:

saving, in the bearer context between the source eNB and the second communication device that is saved in the source eNB, the eNB identifier of the handover target eNB of the first communication device and the radio network temporary identifier that is allocated to the first communication device by the handover target eNB of the first communication device.

With reference to the sixth possible implementation manner of the first aspect, in a seventh possible implementation manner, the method further includes:

acquiring report information of the second communication device;

determining, according to the acquired report information of the second communication device, whether the second communication device needs to perform handover processing; and if the second communication device needs to perform the handover processing, sending a handover request message to a handover target eNB of the second communication device, where the handover request message includes the bearer context between the source eNB and the second communication device, the eNB identifier of the handover target eNB of the first communication device, and the radio network temporary identifier that is allocated to the first communication device by the handover target eNB of the first communication device.

According to a second aspect, an embodiment of the present invention provides a cooperative communication processing method, where the method includes:

acquiring a handover request message sent by a source eNB, where the handover request message includes a first bearer context between the source eNB and a first communication device that needs to perform a communication handover, and a supporting device or a benefited device;

allocating a second bearer context to the first communication device according to the bearer context between the source eNB and the first communication device in the handover request message; and sending a handover acknowledge message to the source eNB, where the handover acknowledge message includes the second bearer context allocated to the first communication device, so that a connection configuration message sent by the source eNB to the first communication device carries the second bearer context allocated to the first communication device, and the first communication device initiates a random access procedure according to the second bearer context allocated to the first communication device.

In a first possible implementation manner of the second aspect, the method further includes:

allocating a radio network temporary identifier to the first communication device; where the handover acknowledge message further includes a eNB identifier of a handover target eNB and the radio network temporary identifier that is allocated to the first communication device, so that the source eNB saves, in a bearer context between the source eNB and a second communication device, the eNB identifier of the handover target eNB and the radio network temporary identifier that is allocated to the first communication device, where the second communication device is a cooperative communication device of the first communication device.

With reference to the first possible implementation manner of the second aspect, in a second possible implementation manner, the method further includes:

after the handover acknowledge message is sent to the source eNB, when a second time interval reaches a threshold, determining that a handover request message for the second communication device is received, where the handover request message for the second communication device includes the bearer context between the source eNB and the second communication device, the eNB identifier of the handover target eNB, and the radio network temporary identifier that is allocated to the first communication device; and if it is confirmed, according to the eNB identifier of the handover target eNB in the handover request message, that the first communication device is still served by the current eNB, performing cooperative communication pairing for the first communication device and the second communication device according to the radio network temporary identifier, which is allocated to the first communication device, in the handover request message for the second communication device; or if it is confirmed, according to the eNB identifier of the handover target eNB in the handover request message, that the first communication device is not served by the current eNB, sending a connection configuration message to the first communication device, so that the first communication device releases all cooperative bearer contexts.

In a third possible implementation manner of the second aspect, the method further includes:

acquiring report information of the first communication device;

after the handover acknowledge message is sent to the source eNB, when a third time interval reaches a threshold, determining, according to the report information of the first communication device, whether the first communication device needs to perform a communication handover to a second target eNB, and if the first communication device needs to perform the communication handover to the second target eNB, sending a handover request message to the second target eNB, where the handover request message includes a non-cooperative bearer context between the handover target eNB and the first communication device;

acquiring a handover acknowledge message returned by the second target eNB, where the handover acknowledge message includes a bearer context that is allocated to the first communication device by the second target eNB; and sending a connection configuration message to the first communication device, where the connection configuration message carries the bearer context that is allocated to the first communication device by the second target eNB, so that the first communication device releases a cooperative bearer context and initiates a random access procedure to the second target eNB according to the bearer context that is allocated to the first communication device by the second target eNB.

According to a third aspect, an embodiment of the present invention further provides a source eNB for implementing cooperative communication processing, where the source eNB includes:

a report information acquiring module, configured to acquire report information of a first communication device, where the first communication device is a supporting device or a benefited device, and a cooperative communication device of the first communication device is a second communication device;

a handover confirming module, configured to determine, according to the report information of the first communication device acquired by the report information acquiring module, whether the first communication device needs to perform a communication handover;

a first configuring module, configured to send a connection configuration message to the first communication device when the handover confirming module confirms that the first communication device needs to perform the communication handover, so that the first communication device releases a cooperative bearer context between the first communication device and the source eNB; and a second configuring module, configured to send a connection configuration message to the second communication device when the handover confirming module confirms that the first communication device needs to perform the communication handover, so that the second communication device releases a cooperative bearer context between the second communication device and the first communication device and a cooperative bearer context between the second communication device and the source eNB, where the second communication device is the cooperative communication device of the first communication device.

In a first possible implementation manner of the third aspect, the source eNB further includes:

a cooperative bearer determining module, configured to confirm that all bearer contexts of the first communication device are cooperative bearer contexts, when the handover confirming module confirms that the first communication device needs to perform the communication handover.

In a second possible implementation manner of the third aspect, the source eNB further includes:

a cooperative bearer determining module, configured to confirm that a bearer context of the first communication device includes a non-cooperative bearer context, when the handover confirming module confirms that the first communication device needs to perform the communication handover;

a handover request sending module, configured to send a handover request message to a handover target eNB of the first communication device when the cooperative bearer determining module confirms that the bearer context of the first communication device includes a non-cooperative bearer context, where the handover request message includes a first bearer context between the source eNB and the first communication device, and the first bearer context includes a non-cooperative bearer context between the source eNB and the first communication device; and a handover acknowledge receiving module, configured to receive a handover acknowledge message from the handover target eNB of the first communication device, where the handover acknowledge message includes a second bearer context that is allocated to the first communication device according to the first bearer context by the handover target eNB of the first communication device; where the first configuring module is specifically configured to:

when the cooperative bearer determining module determines that the bearer context of the first communication device includes a non-cooperative bearer context, send the connection configuration message to the first communication device, where the connection configuration message carries the second bearer context that is allocated to the first communication device by the handover target eNB of the first communication device, so that the first communication device initiates a random access procedure to the handover target eNB of the first communication device according to the second bearer context that is allocated to the first communication device by the handover target eNB of the first communication device and received by the handover acknowledge receiving module.

With reference to the second possible implementation manner of the third aspect, in a third possible implementation manner, the first bearer context further includes the cooperative bearer context between the source eNB and the first communication device.

In a fourth possible implementation manner of the third aspect, the source eNB further includes:

a handover request sending module, configured to send a handover request message to a handover target eNB of the first communication device, where the handover request message includes a first bearer context between the source eNB and the first communication device, and the first bearer context includes the cooperative bearer context and a non-cooperative bearer context between the source eNB and the first communication device; and a handover acknowledge receiving module, configured to receive a handover acknowledge message from the handover target eNB of the first communication device, where the handover acknowledge message includes a second bearer context that is allocated to the first communication device according to the first bearer context by the handover target eNB of the first communication device; where the first configuring module is specifically configured to:

send the connection configuration message to the first communication device, where the connection configuration message carries the second bearer context that is allocated to the first communication device by the handover target eNB of the first communication device and received by the handover acknowledge receiving module, so that the first communication device initiates a random access procedure to the handover target eNB of the first communication device according to the second bearer context that is allocated to the first communication device by the handover target eNB of the first communication device.

With reference to the second or fourth possible implementation manner of the third aspect, in a fifth possible implementation manner, the source eNB further includes:

a first determining module, configured to: after the handover acknowledge receiving module receives the handover acknowledge message from the handover target eNB of the first communication device, when a first time interval reaches a threshold, determine whether the second communication device is still served by the source eNB, and if the second communication device is still served by the source eNB, trigger the second configuring module to send the connection configuration message to the second communication device.

With reference to the second or fourth possible implementation manner of the third aspect, in a sixth possible implementation manner, the handover acknowledge message received by the handover acknowledge receiving module further includes a eNB identifier of the handover target eNB of the first communication device and a radio network temporary identifier that is allocated to the first communication device by the handover target eNB of the first communication device, and the source eNB further includes:

a radio network temporary identifier saving module, configured to save, in the bearer context between the source eNB and the second communication device that is saved in the source eNB, the eNB identifier of the handover target eNB of the first communication device and the radio network temporary identifier that is allocated to the first communication device by the handover target eNB of the first communication device.

With reference to the sixth possible implementation manner of the third aspect, in a seventh possible implementation manner, the report information acquiring module is further configured to acquire report information of the second communication device;

the handover confirming module is further configured to determine, according to the acquired report information of the second communication device, whether the second communication device needs to perform handover processing; and the handover request sending module is further configured to send a handover request message to a handover target eNB of the second communication device when the handover confirming module confirms that the second communication device needs to perform a communication handover, where the handover request message includes the bearer context between the source eNB and the second communication device, the eNB identifier of the handover target eNB of the first communication device, and the radio network temporary identifier that is allocated to the first communication device by the handover target eNB of the first communication device.

According to a fourth aspect, an embodiment of the present invention further provides a handover target eNB for implementing cooperative communication processing, where the handover target eNB includes:

a handover request acquiring module, configured to acquire a handover request message sent by a source eNB, where the handover request message includes a first bearer context between the source eNB and a first communication device that needs to perform a communication handover, and the first communication device is a supporting device or a benefited device;

a bearer allocating module, configured to allocate a second bearer context to the first communication device according to the first bearer context between the source eNB and the first communication device in the handover request message; and a handover acknowledge sending module, configured to send a handover acknowledge message to the source eNB, where the handover acknowledge message includes the second bearer context allocated to the first communication device, so that a connection configuration message sent by the source eNB to the first communication device carries the second bearer context allocated to the first communication device, and the first communication device initiates a random access procedure according to the second bearer context allocated to the first communication device.

In a first possible implementation manner of the fourth aspect, the handover target eNB further includes:

a radio network temporary identifier allocating module, configured to allocate a radio network temporary identifier to the first communication device; where the handover acknowledge message sent by the handover acknowledge sending module to the source eNB further includes a eNB identifier of the handover target eNB and the radio network temporary identifier that is allocated to the first communication device, so that the source eNB saves, in a bearer context between the source eNB and a second communication device, the eNB identifier of the handover target eNB and the radio network temporary identifier that is allocated to the first communication device, where the second communication device is a cooperative communication device of the first communication device.

With reference to the first possible implementation manner of the fourth aspect, in a second possible implementation manner, the handover target eNB further includes:

a second determining module, configured to: after the handover acknowledge sending module sends the handover acknowledge message to the source eNB, when a second time interval reaches a threshold, determine whether a handover request message for the second communication device is received and whether the first communication device is still served by the handover target eNB, where the handover request message for the second communication device includes the bearer context between the source eNB and the second communication device, the eNB identifier of the handover target eNB, and the radio network temporary identifier that is allocated to the first communication device;

a pairing synthesizing module, configured to: when a determining result of the second determining module is yes, perform cooperative communication pairing for the first communication device and the second communication device according to the radio network temporary identifier, which is allocated to the first communication device, in the handover request message for the second communication device; and a third configuring module, configured to: when a determining result of the second determining module is no, send a connection configuration message to the first communication device, so that the first communication device releases all cooperative bearer contexts.

In a third possible implementation manner of the fourth aspect, the handover target eNB further includes:

a report information acquiring module, configured to acquire report information of the first communication device;

a third determining module, configured to: after the handover acknowledge sending module sends the handover acknowledge message to the source eNB, when a third time interval expires, determine, according to the report information of the first communication device, whether the first communication device needs to perform a communication handover to a second target eNB;

a handover request sending module, configured to send a handover request message to the second target eNB when a determining result of the third determining module is yes, where the handover request message includes a non-cooperative bearer context between the handover target eNB and the first communication device;

a handover acknowledge receiving module, configured to acquire a handover acknowledge message returned by the second target eNB, where the handover acknowledge message includes a bearer context that is allocated to the first communication device by the second target eNB according to the non-cooperative bearer context between the handover target eNB and the first communication device; and a fourth configuring module, configured to send a connection configuration message to the first communication device, where the connection configuration message carries the bearer context that is allocated to the first communication device by the second target eNB, so that the first communication device releases a cooperative bearer context and initiates a random access procedure to the second target eNB according to the bearer context that is allocated to the first communication device by the second target eNB.

According to a fifth aspect, an embodiment of the present invention further provides a cooperative communication processing method, where the method includes:

sending, by a first communication device, report information to a source eNB, so that the source eNB confirms, according to the report information, that the first communication device needs to perform a communication handover, where the first communication device is a supporting device or a benefited device;

receiving, by the first communication device, a connection configuration message from the source eNB after the source eNB confirms that the first communication device needs to perform the communication handover; and releasing, by the first communication device, a cooperative bearer context between the first communication device and the source eNB according to the connection configuration message.

In a first possible implementation manner of the fifth aspect, the method further includes:

releasing, by the first communication device, a cooperative bearer context between the first communication device and a second communication device according to the connection configuration message, where the second communication device is a cooperative communication device of the first communication device.

In a second possible implementation manner of the fifth aspect, the connection configuration message acquired from the source eNB further includes a bearer context that is allocated to the first communication device by a handover target eNB of the first communication device; and the method further includes:

initiating, by the first communication device, a random access procedure to the handover target eNB according to the bearer context that is allocated to the first communication device by the handover target eNB.

According to a sixth aspect, an embodiment of the present invention further provides a cooperative communication processing method, where the method includes:

receiving, by a second communication device, a connection configuration message from a source eNB, where the second communication device is a supporting device or a benefited device; and releasing, by the second communication device, a cooperative bearer context between the second communication device and a first communication device and a cooperative bearer context between the second communication device and the source eNB according to the connection configuration message, where the first communication device is a cooperative communication device of the second communication device.

In a first possible implementation manner of the sixth aspect, the method further includes:

sending, by the second communication device, report information to the source eNB, so that the source eNB confirms, according to the report information, that the second communication device needs to perform a communication handover.

According to a seventh aspect, an embodiment of the present invention further provides a communication device, where the communication device is a supporting device or a benefited device, and the communication device includes:

a report information sending module, configured to send report information to a source eNB, so that the source eNB confirms, according to the report information, that the communication device needs to perform a communication handover;

a connection configuration acquiring module, configured to receive a connection configuration message from the source eNB after the source eNB confirms that the communication device needs to perform the communication handover; and a bearer releasing module, configured to release a cooperative bearer context between the communication device and the source eNB according to the connection configuration message that is acquired by the connection configuration acquiring module.

In a first possible implementation manner of the seventh aspect, the bearer releasing module is further configured to release a cooperative bearer context between the communication device and a second communication device according to the connection configuration message, where the second communication device is a cooperative communication device of the communication device.

In a second possible implementation manner of the seventh aspect, the connection configuration message acquired by the connection configuration acquiring module from the source eNB further includes a bearer context that is allocated to the communication device by a handover target eNB of the communication device; and the communication device further includes:

a random access module, configured to initiate a random access procedure to the handover target eNB according to the bearer context that is allocated to the communication device by the handover target eNB.

According to an eighth aspect, an embodiment of the present invention further provides a communication device, where the communication device is a supporting device or a benefited device, and the communication device includes:

a connection configuration acquiring module, configured to receive a connection configuration message from a source eNB; and a bearer releasing module, configured to release a cooperative bearer context between the communication device and a first communication device and a cooperative bearer context between the communication device and the source eNB according to the connection configuration message, where the first communication device is a cooperative communication device of the communication device.

In a first possible implementation manner of the eighth aspect, the communication device further includes:

a report information sending module, configured to send report information to the source eNB, so that the source eNB confirms, according to the report information, that the communication device needs to perform a communication handover.

According to a ninth aspect, an embodiment of the present invention further provides a cooperative communication system, including the first communication device provided in the seventh aspect, the second communication device provided in the eighth aspect, the source eNB provided in the third aspect, and the handover target eNB provided in the fourth aspect in the embodiments of the present invention, where the first communication device and the second communication device are mutually cooperative communication devices.

According to the embodiments of the present invention, when a source eNB determines that either one of cooperative communication devices needs to perform a communication handover, the source eNB sends a connection configuration message to each of two devices, so that the two devices release a cooperative bearer context. Therefore, release processing of a cooperative communication relationship between cooperative communication devices in a communication handover process is implemented.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, when two or more UEs (user equipment, user equipment) all support both a short-range communications technology and a cellular communications technology, a MUCC relationship may be established between the UEs. The short-range communications technology may be, for example, Wi-Fi (wireless fidelity) or Bluetooth (Bluetooth technology), and the cellular communications technology may be, for example, LTE (Long Term Evolution), 3G UMTS (Universal Mobile Telecommunications System) or CDMA (Code Division Multiple Access), 2G GSM (Global System for Mobile Communications), or WiMAX (Worldwide Interoperability for Microwave Access). For example, when a UE needs to send or receive data, to increase reliability and a throughput rate, one or more additional UEs (which may be referred to as supporting UEs, or assisting UEs, and are UEs used to perform data forwarding to assist a benefited UE) may support the UE (which is referred to as a benefited UE, or an assisted UE, and is a final data sender/receiver and user), and assist the UE in communication. The UEs are located in a same range for a short-distance connection. During downlink data transmission, a network may send the downlink data to each of the UEs (an optimized method is that, during network scheduling, a UE having a best radio link condition is always selected for sending). If the data does not reach the final benefited UE, a supporting UE receiving the data sends the data to the benefited UE by means of short-range communication (for example, Wi-Fi). Certainly, the data may also directly reach the benefited UE. The benefited UE may combine the data. Likewise, uplink data of the benefited UE may be sent to the network through the benefited UE or another supporting UE, and then the network combines the data to complete cooperative communication between UEs. Concepts of the benefited UE and the supporting UE are viewed from the perspective of a bearer of the benefited UE. For example, a UE1 and a UE2 constitute a MUCC relationship, and they may assist each other in communication.

In this way, from the perspective of a bearer of the UE1, the UE2 may support the bearer of the UE1, and therefore, the UE1 is a benefited UE, and the UE2 is a supporting UE. Meanwhile, the UE1 may also support a bearer of the UE2, and therefore, from the perspective of the bearer of the UE2, the UE2 is a benefited UE, and the UE1 is a supporting UE.

Figure 1:
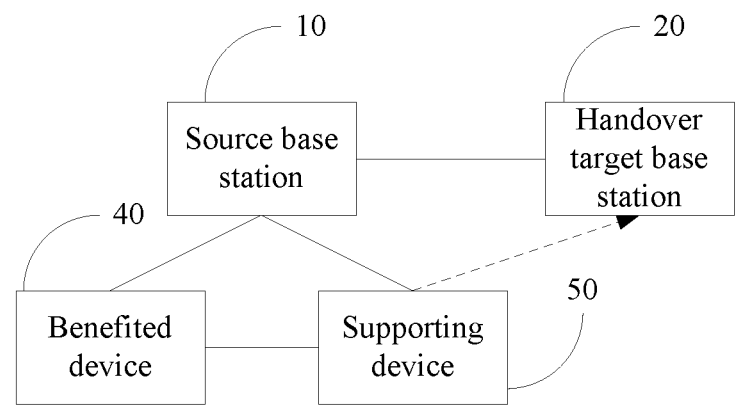
FIG. 1 is a schematic diagram of a composition structure of a cooperative communication system according to an embodiment of the present invention.

FIG. 1 is a schematic diagram of a composition structure of a cooperative communication system according to an embodiment of the present invention. As shown in the figure, the cooperative communication system in the present invention includes a source eNB 10 and a handover target eNB 20. The source eNB 10 includes at least one pair of cooperative communication devices: a supporting device 50 used as a communication data forwarding device and a benefited device 40 used as a communication data destination device, and may further include another cooperative communication device, where the supporting device 50 may also have another benefited device correspondingly, and the benefited device 40 may also have another supporting device.

The source eNB 10 is configured to acquire report information of the supporting device 50 and report information of the benefited device 40, and may confirm, according to the report information of the supporting device 50 and the report information of the benefited device 40, whether the supporting device 50 or the benefited device 40 needs to perform a communication handover. The report information in the embodiment of the present invention includes but is not limited to information such as signal quality or strength of a current cell and a neighboring cell. If the signal quality or strength of the current cell is less than a threshold, or is poorer than that of the neighboring cell, and a difference exceeds a threshold, it may be confirmed that the supporting device 50 or the benefited device 40 needs to perform a communication handover. After it is confirmed that the supporting device 50 or the benefited device 40 needs to perform the communication handover, a connection configuration message may be sent to each of the two devices, so that the supporting device 50 and the benefited device 40 release cooperative bearer contexts. In the embodiment of the present invention, the supporting device 50 or the benefited device 40 may be handed over to the handover target eNB 20. A bearer context in the embodiment of the present invention refers to related information of an air interface bearer, and mainly includes a related configuration parameter in a protocol stack for establishing the air interface bearer, and is saved in each of devices at two ends of the bearer. Bearer contexts may include a cooperative bearer context and a non-cooperative bearer context. The non-cooperative bearer context is related information of an air interface bearer established between a device and a eNB for communication of the device, and the cooperative bearer context includes related information of an air interface bearer that is established between a supporting device and a eNB to assist a benefited device and related information of a short-range bearer between the supporting device and the benefited device.

Figure 2:
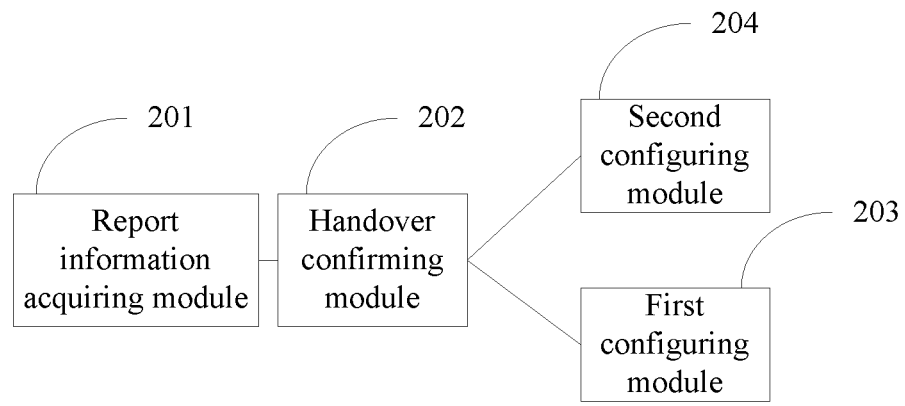
FIG. 2 is a schematic diagram of a composition structure of a source eNB according to an embodiment of the present invention.

FIG. 2 is a schematic diagram of a composition structure of a source eNB according to an embodiment of the present invention. The source eNB shown in the figure is a source eNB, including a report information acquiring module 201, a handover confirming module 202, a first configuring module 203, and a second configuring module 204.

The report information acquiring module 201 is configured to acquire report information of a first communication device, where the first communication device is a supporting device or a benefited device. In specific implementation, the report information may include but is not limited to information such as signal quality or strength of a current cell in which the first communication device is located and signal quality or strength of a neighboring cell.

The handover confirming module 202 is configured to determine, according to the report information of the first communication device, whether the first communication device needs to perform a communication handover. In specific implementation, the handover confirming module 202 of the source eNB may determine, according to the report information of the first communication device acquired by the report information acquiring module 201, whether the first communication device needs to perform the communication handover. If the signal quality or strength of the current cell in which the first communication device is located is less than a threshold, or is poorer than that of the neighboring cell, and a difference exceeds a threshold, it may be confirmed that the first communication device needs to perform the communication handover.

The first configuring module 203 is configured to send a connection configuration message to the first communication device when the handover confirming module 202 confirms that the first communication device needs to perform the communication handover, so that the first communication device releases a cooperative bearer context between the first communication device and the source eNB, and the first communication device releases a cooperative bearer context between the first communication device and a second communication device. A connection configuration process in the present invention may include may include at least one signaling interaction between a eNB and a communication device. Delivery of the connection configuration message may be completed through multiple back-and-forth message interactions, so that the communication device performs a radio resource configuration according to the connection configuration message. Specifically, the connection configuration message sent by the first configuring module 203 to the first communication device may be an RRC (Radio Resource Control, Radio Resource Control) connection reconfiguration message, to instruct the first communication device to perform a bearer context reconfiguration, including releasing a bearer context that needs to be reconfigured. In this embodiment, the first communication device is instructed to release the cooperative bearer context between the first communication device and the source eNB, and the first communication device may further be instructed to release the cooperative bearer context between the first communication device and the second communication device. Bearer contexts of the first communication device include cooperative bearer contexts and non-cooperative bearer contexts, where the cooperative bearer contexts of the first communication device include the cooperative bearer context between the first communication device and the second communication device and the cooperative bearer context between the first communication device and the source eNB. When the first communication device further has a cooperative communication relationship with another communication device, the bearer contexts further include a cooperative bearer context between the first communication device and the another cooperative communication device. In another embodiment, for example, when the first communication device has only a cooperative bearer context, the connection configuration message sent by the first configuring module 203 to the first communication device may also be an RRC connection release message, to instruct the first communication device to release all bearer contexts.

The second configuring module 204 is configured to send a connection configuration message to the second communication device when the handover confirming module 202 confirms that the first communication device needs to perform the communication handover, so that the second communication device releases the cooperative bearer context between the second communication device and the first communication device and a cooperative bearer context between the second communication device and the source eNB. The second communication device is a cooperative communication device of the first communication device. When the first communication device is a supporting device, a cooperative communication device of the first communication device, that is, the second communication device, is a benefited device. When the first communication device is a benefited device, a cooperative communication device of the first communication device, that is the second communication device, is a supporting device. Specifically, the connection configuration message sent by the second configuring module 204 to the second communication device may be an RRC connection reconfiguration message, to instruct the second communication device to perform a bearer context reconfiguration, including releasing a bearer context that needs to be reconfigured. In this embodiment, the second communication device is instructed to release the cooperative bearer context between the second communication device and the first communication device and the cooperative bearer context between the second communication device and the source eNB. Bearer contexts of the second communication device include cooperative bearer contexts and non-cooperative bearer contexts, where the cooperative bearer contexts of the second communication device include the cooperative bearer context between the second communication device and the first communication device and the cooperative bearer context between the second communication device and the source eNB. When the second communication device further has a cooperative communication relationship with another communication device, the bearer contexts further include a cooperative bearer context between the second communication device and the another cooperative communication device. Optionally, the second configuring module 204 may perform cooperative communication pairing for the second communication device again after sending the connection configuration message to the second communication device.

Figure 3:
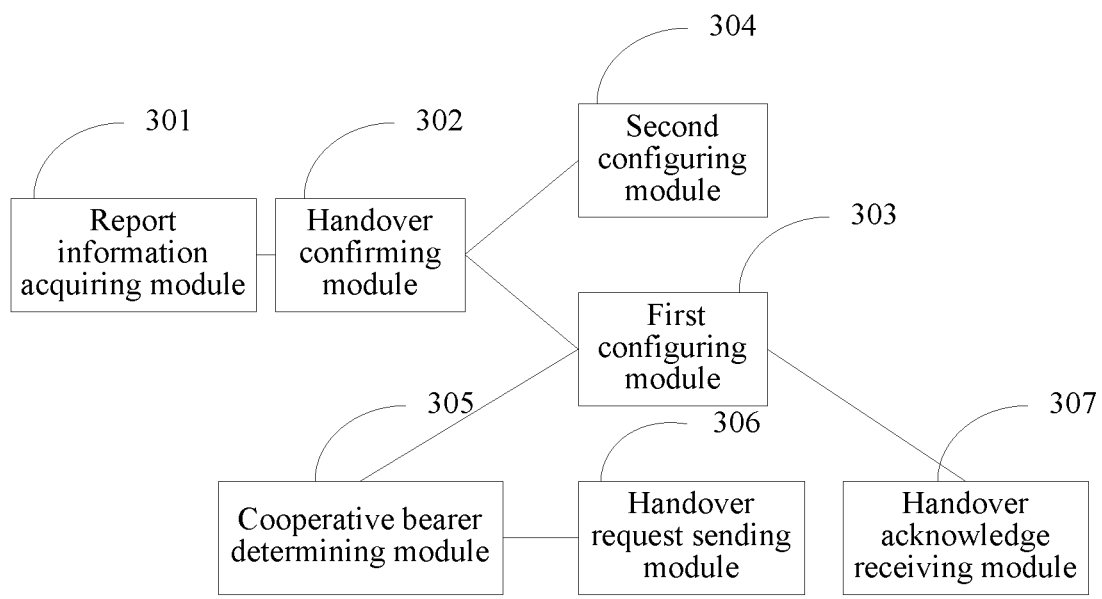
FIG. 3 is a schematic diagram of a composition structure of a source eNB according to another embodiment of the present invention.

FIG. 3 is a schematic diagram of a composition structure of a source eNB according to another embodiment of the present invention. As shown in the figure, the source eNB in the embodiment includes a report information acquiring module 301, a handover confirming module 302, a first configuring module 303, a second configuring module 304, a cooperative bearer determining module 305, a handover request sending module 306, and a handover acknowledge receiving module 307.

The report information acquiring module 301, the handover confirming module 302, and the second configuring module 304 are the same as the report information acquiring module 201, the handover confirming module 202, and the second configuring module 204 respectively in the foregoing embodiment, and are not further described in this embodiment.

The cooperative bearer determining module 305 is configured to confirm that all bearer contexts of the first communication device are cooperative bearer contexts, when the handover confirming module 302 confirms that the first communication device needs to perform the communication handover. The first communication device is a communication device that needs to perform a communication handover in this embodiment, and may be a supporting device or a benefited device, and a cooperative communication device of the first communication device is a second communication device.

The handover request sending module 306 is configured to send a handover request message to a handover target eNB of the first communication device when the cooperative bearer determining module 305 determines that the bearer context of the first communication device includes a non-cooperative bearer context, where the handover request message includes a non-cooperative bearer context between the source eNB and the first communication device. Further, optionally, the handover request message sent by the handover request sending module 306 to the handover target eNB may further include a cooperative bearer context between the source eNB and the first communication device, that is, all the bearer contexts of the first communication device are handed over to the handover target eNB.

The handover acknowledge receiving module 307 is configured to receive a handover acknowledge message from the handover target eNB of the first communication device, where the handover acknowledge message includes a bearer context that is allocated to the first communication device by the handover target eNB of the first communication device. Specifically, after receiving the handover request message sent by the handover request sending module 306, the handover target eNB of the first communication device allocates a corresponding second bearer context to the first communication device according to a first bearer context between the source eNB and the first communication device that is carried in the handover request message. That is, if the handover request message carries only the non-cooperative bearer context between the source eNB and the first communication device, the handover target eNB of the first communication device also allocates only a corresponding non-cooperative bearer context to the first communication device; and if the handover request message carries all bearer contexts between the source eNB and the first communication device, the handover target eNB of the first communication device also allocates all corresponding bearer contexts to the first communication device.

The first configuring module 303 is configured to send a connection configuration message to the first communication device. When the cooperative bearer determining module 305 determines that all the bearer contexts of the first communication device are cooperative bearer contexts, the connection configuration message sent by the first configuring module 303 to the first communication device is used to instruct the first communication device to release the cooperative bearer context between the first communication device and the source eNB and the cooperative bearer context between the first communication device and the second communication device; and when the cooperative bearer determining module 305 determines that the bearer context of the first communication device includes a non-cooperative bearer context, the connection configuration message sent by the first configuring module 303 to the first communication device carries the bearer context that is allocated to the first communication device by the handover target eNB of the first communication device, and is used to instruct the first communication device to release the cooperative bearer context between the first communication device and the source eNB and initiate a random access procedure to the handover target eNB of the first communication device according to the bearer context that is allocated to the first communication device by the handover target eNB of the first communication device.

Figure 4:
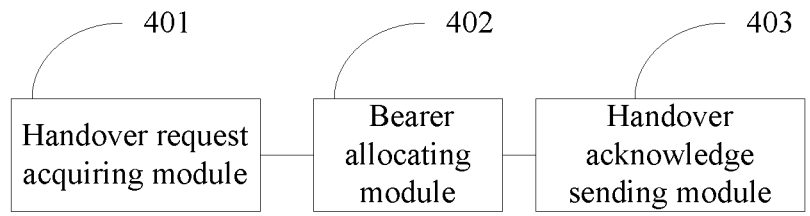
FIG. 4 is a schematic diagram of a composition structure of a handover target eNB according to an embodiment of the present invention.

FIG. 4 is a schematic diagram of a composition structure of a handover target eNB according to another embodiment of the present invention. As shown in the figure, the target eNB in the embodiment includes at least a handover request acquiring module 401, a bearer allocating module 402, and a handover acknowledge sending module 403.

The handover request acquiring module 401 is configured to acquire a handover request message sent by a source eNB, where the handover request message includes the first bearer context between the source eNB and a first communication device that needs to perform a communication handover, the first communication device is a supporting device or a benefited device, and a cooperative communication device of the first communication device is a second communication device.

The bearer allocating module 402 is configured to allocate a second bearer context to the first communication device according to a first bearer context between the source eNB and the first communication device in the handover request message. Specifically, after the handover request acquiring module 401 receives the handover request message sent by the source eNB, the bearer allocating module 402 allocates the corresponding second bearer context to the first communication device according to the first bearer context between the source eNB and the first communication device that is carried in the handover request message. That is, if the handover request message carries only a non-cooperative bearer context between the source eNB and the first communication device, the handover target eNB of the first communication device also allocates only a corresponding non-cooperative bearer context to the first communication device; and if the handover request message carries all bearer contexts between the source eNB and the first communication device, the handover target eNB of the first communication device also allocates all corresponding bearer contexts to the first communication device.

The handover acknowledge sending module 403 is configured to send a handover acknowledge message to the source eNB, where the handover acknowledge message includes the second bearer context allocated to the first communication device by the bearer allocating module 402, so that a connection configuration message sent by the source eNB to the first communication device carries the second bearer context allocated to the first communication device, and the first communication device initiates a random access procedure according to the second bearer context allocated to the first communication device by the bearer allocating module 402.

Figure 5:
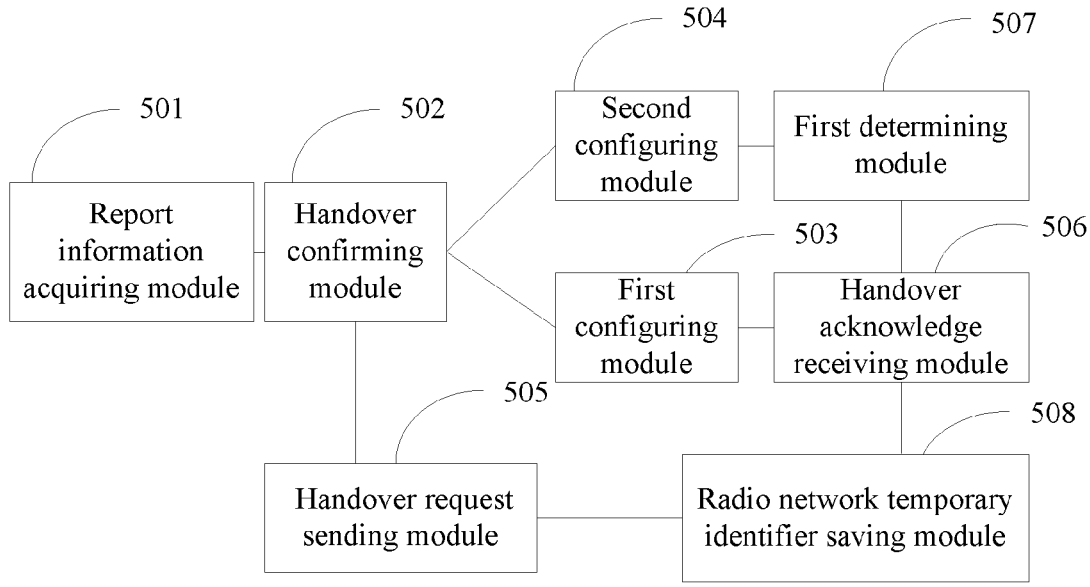
FIG. 5 is a schematic diagram of a composition structure of a source eNB according to another embodiment of the present invention.

FIG. 5 is a schematic diagram of a composition structure of a source eNB according to another embodiment of the present invention. As shown in the figure, the source eNB in the embodiment includes at least a report information acquiring module 501, a handover confirming module 502, a first configuring module 503, a second configuring module 504, a handover request sending module 505, a handover acknowledge receiving module 506, a first determining module 507, and a radio network temporary identifier saving module 508.

The report information acquiring module 501 is configured to acquire report information of a first communication device and report information of a second communication device, where the report information may include information such as signal quality or strength of a current cell in which the first communication device is located, signal quality or strength of a current cell in which the second communication device is located, and signal quality or strength of a neighboring cell. The first communication device and the second communication device are mutually cooperative communication devices. The first communication device is a communication device that first needs to perform a communication handover in this embodiment, and may be a supporting device or a benefited device. The second communication device is a cooperative communication device of the first communication device. When the first communication device is a supporting device, a cooperative communication device of the first communication device, that is, the second communication device, is a benefited device. When the second communication device is a benefited device, a cooperative communication device of the second communication device, that is, the second communication device, is a supporting device.

The handover confirming module 502 is configured to respectively determine, according to the report information of the first communication device and the report information of the second communication device, whether the first communication device and the second communication device need to perform a communication handover. Because the first communication device and the second communication device may be supporting devices or benefited devices in different embodiments, in this embodiment, one of the two communication devices that is confirmed to first need to perform a communication handover is set to the first communication device, and a cooperative communication device of the first communication device is set to the second communication device.

The handover request sending module 505 is configured to send a handover request message to a handover target eNB of the first communication device when the handover confirming module 502 confirms that the first communication device needs to perform the communication handover, where the handover request message for the first communication device includes a first bearer context between the source eNB and the first communication device; and the handover request sending module 505 is configured to send a handover request message to a handover target eNB of the second communication device when the handover confirming module 502 confirms that the second communication device needs to perform the communication handover, where the handover request message for the second communication device may include a first bearer context between the source eNB and the second communication device, and may further include a eNB identifier of the handover target eNB of the first communication device and a radio network temporary identifier that is allocated to the first communication device by the handover target eNB of the first communication device, in order to notify the handover target eNB of the second communication device that the cooperative communication device of the second communication device currently requesting to be handed over has performed a communication handover, where the eNB identifier and the radio network temporary identifier are saved in the bearer context between the source eNB and the second communication device by the radio network temporary identifier saving module 508. Further, the handover target eNB of the first communication device and the handover target eNB of the second communication device may be a same target eNB, or may be different target eNBs. If the handover target eNB of the second communication device is the same as a handover target of the first communication device, it indicates that the second communication device is handed over to the same target eNB as the first communication device, and in this case, the handover target eNB of the two communication devices may perform cooperative communication pairing for the two communication devices. Further, in this embodiment, the bearer context between the source eNB and the first communication device or the second communication device in the handover request message may include a non-cooperative bearer context and a cooperative bearer context, that is, all bearer contexts of the first communication device or the second communication device are handed over to a respective handover target eNB.

The handover acknowledge receiving module 506 is configured to receive a handover acknowledge message from the handover target eNB of the first communication device or receive a handover acknowledge message from the handover target eNB of the second communication device, where the handover acknowledge message for the first communication device includes a second bearer context that is allocated to the first communication device by the handover target eNB of the first communication device, the eNB identifier of the handover target eNB of the first communication device, and the radio network temporary identifier (C-RNTI, Cell-Radio Network Temporary Identifier) that is allocated to the first communication device by the handover target eNB of the first communication device. Specifically, after receiving the handover request message sent by the handover request sending module 505, the handover target eNB of the first communication device allocates the corresponding second bearer context to the first communication device according to the first bearer context between the source eNB and the first communication device that is carried in the handover request message, and further allocates the radio network temporary identifier to the first communication device. Likewise, content of the handover acknowledge message for the second communication device is similar to that of the handover acknowledge message for the first communication device, and is not further described herein.

The first determining module 507 is configured to: after the handover acknowledge receiving module 506 receives the handover acknowledge message from the handover target eNB of the first communication device, when a first time interval expires, determine whether the second communication device is still served by the source eNB, and if the second communication device is still served by the source eNB, trigger the second configuring module 504 to send a connection configuration message to the second communication device. The first time interval is a time period for reserving a cooperative bearer context of the second communication device by the source eNB. Sometimes, the second communication device is handed over together with the first communication device, and in this case, the cooperative bearer context in the second communication device actually does not need to be released completely. To avoid this case, the first time interval may be preset in the source eNB to reserve the cooperative bearer context of the second communication device for a time period, for example, one or two minutes. After the first time interval expires, whether the second communication device is still served by the source eNB is determined, and if the second communication device is still served by the source eNB, the second configuring module 504 is triggered to send a connection configuration message to the second communication device; otherwise, it indicates that the second communication device has been handed over to another eNB, and the second configuring module 504 does not need to send a connection configuration message to the second communication device.

The radio network temporary identifier saving module 508 is configured to save, in the bearer context between the source eNB and the second communication device, the eNB identifier of the handover target eNB of the first communication device and the radio network temporary identifier that is allocated to the first communication device by the handover target eNB of the first communication device. Specifically, after the handover acknowledge receiving module 506 receives the handover acknowledge message sent by the handover target eNB of the first communication device, the radio network temporary identifier saving module 508 of the source eNB saves, in the bearer context between the source eNB and the second communication device, the eNB identifier of the handover target eNB of the first communication device and the radio network temporary identifier that is allocated to the first communication device by the handover target eNB of the first communication device.

The first configuring module 503 is configured to send a connection configuration message to the first communication device after the handover acknowledge receiving module 506 receives the handover acknowledge message sent by the handover target eNB of the first communication device; and send a connection configuration message to the second communication device after the handover acknowledge receiving module 506 receives the handover acknowledge message sent by the handover target eNB of the second communication device. Specifically, the connection configuration message sent to the first communication device carries the second bearer context that is allocated to the first communication device by the handover target eNB of the first communication device, to instruct the first communication device to release the cooperative bearer context between the first communication device and the source eNB and instruct the first communication device to initiate a random access procedure to the handover target eNB of the first communication device according to the second bearer context that is allocated to the first communication device by the handover target eNB of the first communication device. The connection configuration message that is sent by the first configuring module 503 to the second communication device when the handover confirming module 502 confirms that the second communication device needs to perform the communication handover is similar, and is not further described. Specifically, the connection configuration message that is sent by the first configuring module 503 to the first communication device or the second communication device may be an RRC (Radio Resource Control, Radio Resource Control Protocol) connection reconfiguration message, to instruct the first communication device or the second communication device to perform a bearer context reconfiguration, including releasing a bearer context that needs to be reconfigured. In this embodiment, the first communication device or the second communication device is instructed to release the cooperative bearer context between the first communication device or the second communication device and the source eNB.

The second configuring module 504 is configured to send the connection configuration message to the second communication device after the first determining module 507 obtains a positive determining result, so that the second communication device releases a cooperative bearer context between the second communication device and the first communication device and the cooperative bearer context between the second communication device and the source eNB.

Figure 6:
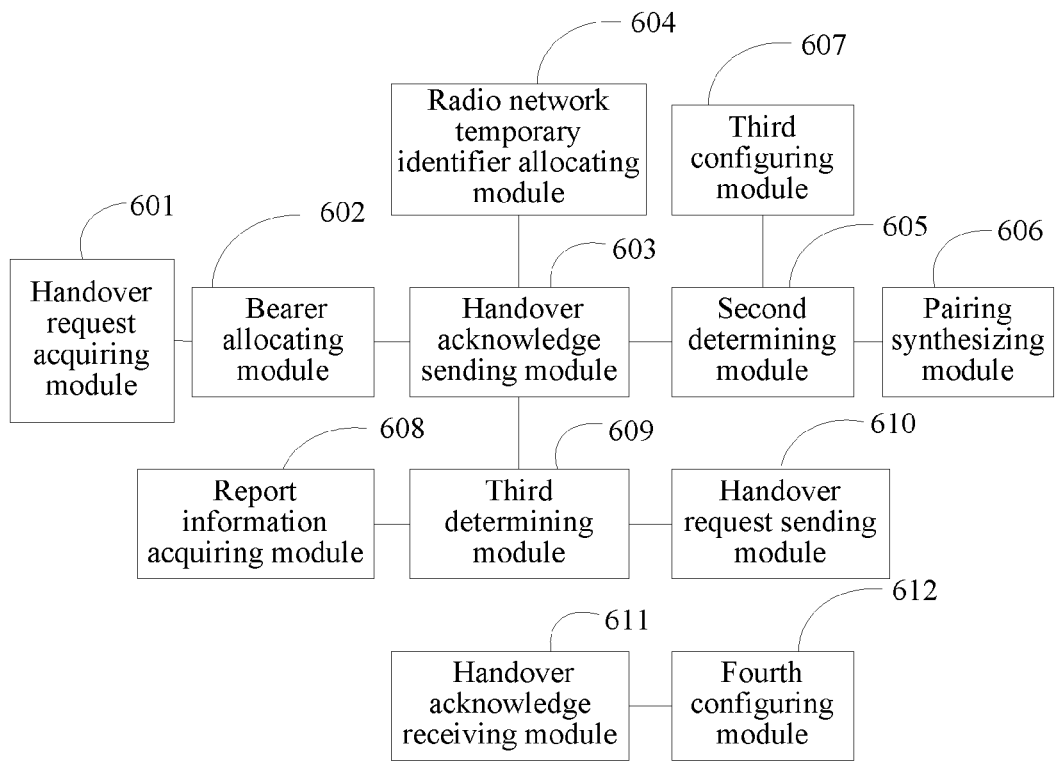
FIG. 6 is a schematic diagram of a composition structure of a handover target eNB according to another embodiment of the present invention.

FIG. 6 is a schematic diagram of a composition structure of a handover target eNB according to another embodiment of the present invention. As shown in the figure, the handover target eNB in the embodiment includes a handover request acquiring module 601, a bearer allocating module 602, a handover acknowledge sending module 603, a radio network temporary identifier allocating module 604, a second determining module 605, a pairing synthesizing module 606, a third configuring module 607, a report information acquiring module 608, a third determining module 609, a handover request sending module 610, a handover acknowledge receiving module 611, and a fourth configuring module 612.

The handover request acquiring module 601 is configured to acquire a handover request message from a source eNB, where a handover request message for a first communication device that first performs a handover includes a bearer context between the source eNB and the first communication device, and a handover request message for a second communication device may include a bearer context between the source eNB and the second communication device, and further includes a eNB identifier of the handover target eNB of the first communication device and a radio network temporary identifier that is allocated to the first communication device by the handover target eNB of the first communication device, where the eNB identifier and the radio network temporary identifier are saved by the source eNB in the bearer context between the source eNB and the second communication device. The first communication device and the second communication device are mutually cooperative communication devices. The first communication device is a communication device that first needs to perform a communication handover in this embodiment, and may be a supporting device or a benefited device. The second communication device is a cooperative communication device of the first communication device. When the first communication device is a supporting device, a cooperative communication device of the first communication device, that is, the second communication device, is a benefited device. When the second communication device is a benefited device, a cooperative communication device of the second communication device, that is, the second communication device, is a supporting device.

The bearer allocating module 602 is configured to allocate a second bearer context to the first communication device according to a first bearer context between the source eNB and the first communication device in the handover request message after the handover request acquiring module 601 acquires the handover request message for the first communication device; and allocate a second bearer context to the second communication device according to a first bearer context between the source eNB and the second communication device in the handover request message after the handover request acquiring module 601 acquires the handover request message for the second communication device.

The radio network temporary identifier allocating module 604 is configured to: after the handover request acquiring module 601 acquires the handover request message, allocate a radio network temporary identifier to the first communication device or the second communication device which needs to perform a communication handover and for which the handover request message is sent.

The handover acknowledge sending module 603 is configured to send a handover acknowledge message to the source eNB, where the handover acknowledge message includes the second bearer context that is allocated to the first communication device or the second communication device by the bearer allocating module 602, the eNB identifier of the handover target eNB, and the radio network temporary identifier that is allocated to the first communication device or the second communication device by the radio network temporary identifier allocating module 604.

The second determining module 605 is configured to: after the handover acknowledge sending module 603 sends the handover acknowledge message for the first communication device to the source eNB, when a second time interval expires, determine whether the handover request message for the second communication device is received and whether the first communication device is still served by the handover target eNB, where the handover request message for the second communication device includes the first bearer context between the source eNB and the second communication device, the eNB identifier of the handover target eNB of the first communication device, and the radio network temporary identifier that is allocated to the first communication device by the handover target eNB of the first communication device. Specifically, the second time interval is a time period for reserving a cooperative bearer context between the first communication device and the second communication device by the handover target eNB. When the handover request acquiring module 601 receives, in the second time interval, the handover request message including the eNB identifier of the handover target eNB and the radio network temporary identifier that is previously allocated to the first communication device, the second determining module 605 may obtain a positive determining result, and trigger the pairing synthesizing module 606 to perform cooperative communication pairing for the first communication device and the second communication device that are both handed over to the current target eNB.

The pairing synthesizing module 606 is configured to: when the determining result obtained by the second determining module 605 is yes, perform cooperative communication pairing for the first communication device and the second communication device according to the radio network temporary identifier, which is allocated to the first communication device, in the handover request message for the second communication device.

The third configuring module 607 is configured to: when the determining result obtained by the second determining module 605 is no, that is, when the handover request message for the second communication device is not received in the second time interval or the first communication device is no longer served by the handover target eNB when the second time interval expires, send a connection configuration message to the first communication device, so that the first communication device releases all cooperative bearer contexts.

The report information acquiring module 608 is configured to acquire report information of the first communication device. Specifically, after the handover acknowledge sending module 603 sends the handover acknowledge message for the first communication device to the source eNB, the source eNB sends a connection configuration message to the first communication device, where the connection configuration message carries the bearer context that is allocated to the first communication device by the handover target eNB. After receiving the connection configuration message, the first communication device initiates a random access procedure to the handover target eNB. Then the report information acquiring module 608 can acquire the report information of the first communication device, where the report information may include signal strength and/or quality of a current cell in which the first communication device is located and signal strength and quality of a neighboring cell.

The third determining module 609 is configured to: after the handover acknowledge sending module 603 sends the handover acknowledge message to the source eNB, when a third time interval expires, determine, according to the report information of the first communication device, whether the first communication device needs to perform a communication handover to a second target eNB, where the second target eNB is a handover target eNB to which the first communication device will perform a second handover.

The handover request sending module 610 is configured to send a handover request message to the second target eNB when a determining result of the third determining module 609 is yes, where the handover request message includes a non-cooperative bearer context between the handover target eNB and the first communication device, that is, only the non-cooperative bearer context of the first communication device is handed over to the second target eNB.

The handover acknowledge receiving module 611 is configured to acquire a handover acknowledge message returned by the second target eNB, where the handover acknowledge message includes a bearer context that is allocated to the first communication device by the second target eNB. Because the handover request message sent by the handover request sending module 610 includes only the non-cooperative bearer context of the first communication device, the second target eNB also allocates only a corresponding non-cooperative bearer context to the first communication device.

The fourth configuring module 612 is configured to send a connection configuration message to the first communication device, where the connection configuration message carries the bearer context that is allocated to the first communication device by the second target eNB, so that the first communication device releases all cooperative bearer contexts and initiates a random access procedure to the second target eNB according to the bearer context that is allocated to the first communication device by the second target eNB.

Figure 10:
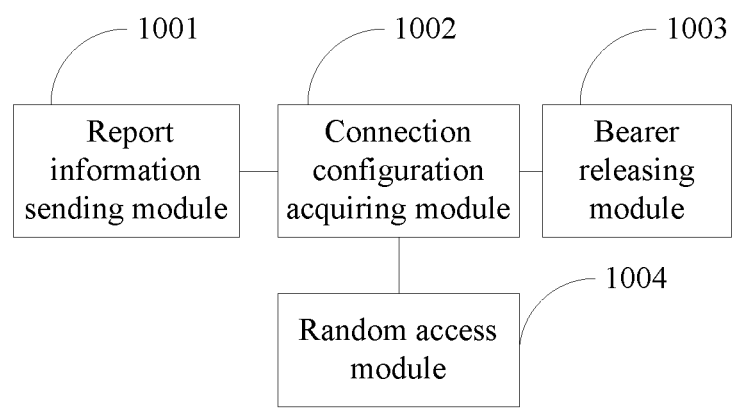
FIG. 10 is a schematic diagram of a composition structure of a first communication device according to an embodiment of the present invention.

A first communication device provided in an embodiment of the present invention may be a supporting device or a benefited device. As shown in FIG. 10, the first communication device may include:

a report information sending module 1001, configured to send report information to a source eNB, so that the source eNB confirms, according to the report information, that the first communication device needs to perform a communication handover;

a connection configuration acquiring module 1002, configured to receive a connection configuration message from the source eNB after the source eNB confirms that the first communication device needs to perform the communication handover, where in an optional embodiment, the connection configuration message acquired by the connection configuration acquiring module 1002 from the source eNB further includes a bearer context that is allocated to the first communication device by a handover target eNB of the first communication device; and a bearer releasing module 1003, configured to release a cooperative bearer context between the first communication device and the source eNB according to the connection configuration message that is acquired by the connection configuration acquiring module 1002, where in an optional embodiment, the bearer releasing module 1003 is further configured to release a cooperative bearer context between the first communication device and a second communication device according to the connection configuration message, and the second communication device is a cooperative communication device of the communication device.

Optionally, the first communication device may further include:

a random access module 1004, configured to initiate a random access procedure to the handover target eNB according to the bearer context that is allocated to the first communication device by the handover target eNB.

Figure 11:
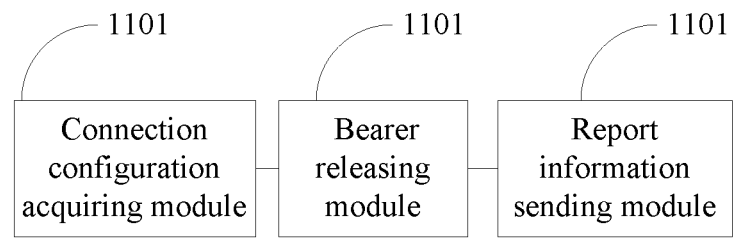
FIG. 11 is a schematic diagram of a composition structure of a second communication device according to an embodiment of the present invention.

A second communication device provided in an embodiment of the present invention may be a supporting device or a benefited device. As shown in FIG. 11, the second communication device may include:

a connection configuration acquiring module 1101, configured to receive a connection configuration message from a source eNB; and a bearer releasing module 1102, configured to release a cooperative bearer context between the second communication device and a first communication device and a cooperative bearer context between the second communication device and the source eNB according to the connection configuration message, where the first communication device is a cooperative communication device of the communication device.

Optionally, the second communication device may further include:

a report information sending module 1103, configured to send report information to the source eNB, so that the source eNB confirms, according to the report information, that the communication device needs to perform a communication handover.

Figure 7:
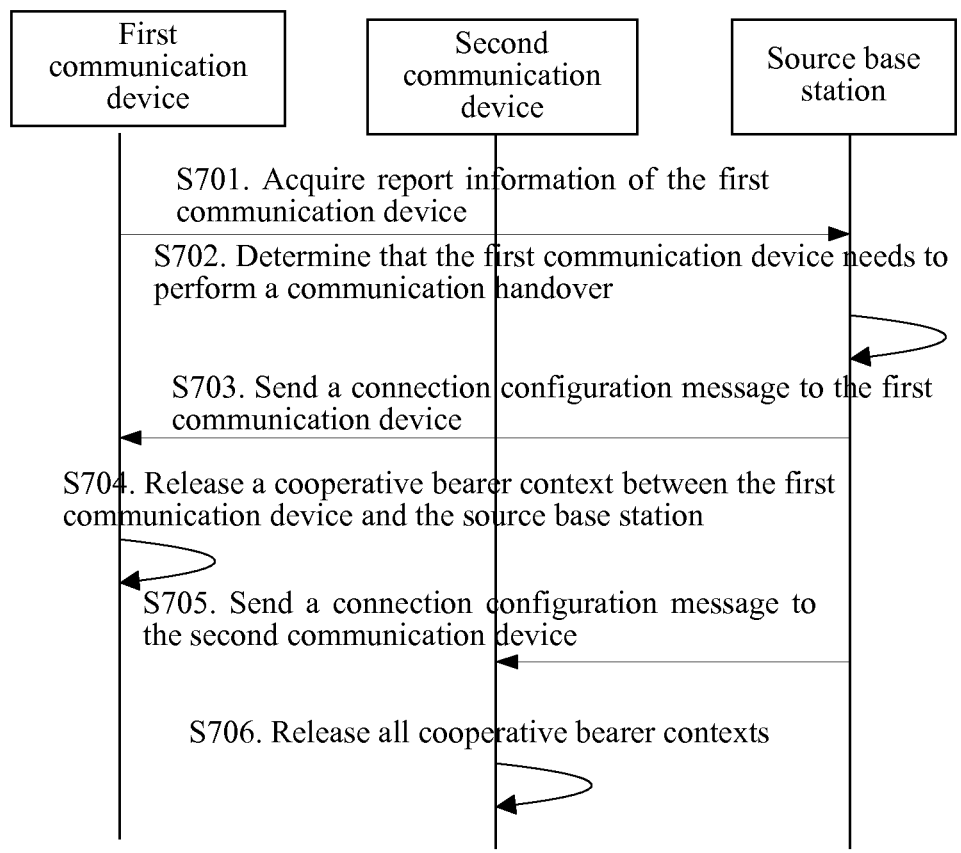
FIG. 7 is a schematic flowchart of a cooperative communication processing method according to an embodiment of the present invention.

FIG. 7 is a schematic flowchart of a first embodiment of a cooperative communication processing method according to the present invention. As shown in the figure, the cooperative communication processing method in the first embodiment of the present invention includes:

S701. A source eNB acquires report information of a first communication device. In specific implementation, the first communication device in this embodiment is a communication device that needs to perform a communication handover, and may be a supporting device or a benefited device. The report information may include but is not limited to information such as signal quality or strength of a current cell in which the first communication device is located and signal quality or strength of a neighboring cell.

S702. The source eNB determines, according to the report information of the first communication device, whether the first communication device needs to perform a communication handover. In specific implementation, according to the report information of the first communication device that is acquired in S701 and indicates, for example, that the signal quality or strength of the current cell in which the first communication device is located is less than a threshold, or is poorer than that of the neighboring cell, and that a difference exceeds a threshold, the source eNB may confirm that the first communication device needs to perform the communication handover, and then executes S703.

S703. The source eNB sends a connection configuration message to the first communication device, so that the first communication device releases a cooperative bearer context between the first communication device and the source eNB. In another optional embodiment, sending a connection configuration message to the first communication device may further cause the first communication device to release a cooperative bearer context between the first communication device and a second communication device. The connection configuration message in the present invention may include at least one signaling interaction between a eNB and a communication device. Delivery of the connection configuration message may be completed through multiple back-and-forth message interactions, so that the communication device performs a radio resource configuration according to the connection configuration message. Specifically, the connection configuration message sent by the source eNB to the first communication device may be an RRC (Radio Resource Control, Radio Resource Control Protocol) connection reconfiguration message, to instruct the first communication device to perform a bearer context reconfiguration, including releasing a bearer context that needs to be reconfigured. In this embodiment, the first communication device is instructed to release the cooperative bearer context between the first communication device and the source eNB, and the first communication device may further be instructed to release the cooperative bearer context between the communication device and the second communication device. Bearer contexts of the first communication device include cooperative bearer contexts and non-cooperative bearer contexts, where the cooperative bearer contexts of the first communication device include the cooperative bearer context between the first communication device and the second communication device and the cooperative bearer context between the first communication device and the source eNB. When the first communication device further has a cooperative communication relationship with another communication device, the bearer contexts may further include a cooperative bearer context between the first communication device and the another cooperative communication device. In another embodiment, for example, when the first communication device has only a cooperative bearer context, the connection configuration message sent by the source eNB to the first communication device may also be an RRC connection release message, to instruct the first communication device to release all bearer contexts.

S704. The first communication device releases the cooperative bearer context between the first communication device and the source eNB.

S705. The source eNB sends a connection configuration message to the second communication device, so that the second communication device releases the cooperative bearer context between the second communication device and the first communication device and a cooperative bearer context between the second communication device and the source eNB. The second communication device is a cooperative communication device of the first communication device. When the first communication device is a supporting device, a cooperative communication device of the first communication device, that is, the second communication device, is a benefited device. When the second communication device is a benefited device, a cooperative communication device of the second communication device, that is, the second communication device, is a supporting device. In specific implementation, the connection configuration message sent by the source eNB to the second communication device may be an RRC connection reconfiguration message, to instruct the second communication device to perform a bearer context reconfiguration, including releasing a bearer context that needs to be reconfigured. In this embodiment, the second communication device is instructed to release the cooperative bearer context between the second communication device and the first communication device and the cooperative bearer context between the second communication device and the source eNB. Bearer contexts of the second communication device include cooperative bearer contexts and non-cooperative bearer contexts, where the cooperative bearer contexts of the second communication device include the cooperative bearer context between the second communication device and the first communication device and the cooperative bearer context between the second communication device and the source eNB. When the second communication device further has a cooperative communication relationship with another communication device, the bearer contexts further include a cooperative bearer context between the second communication device and the another cooperative communication device. Optionally, the source eNB may perform cooperative communication pairing for the second communication device again after sending the connection configuration message to the second communication device. It should be pointed out that, there is no limitation on a necessary logical time sequence between S703 and S705. An execution sequence of the two steps may be reversed, which does not affect implementation of the present invention.

S706. The second communication device releases the cooperative bearer context between the second communication device and the first communication device and the cooperative bearer context between the second communication device and the source eNB.

Figure 8A:
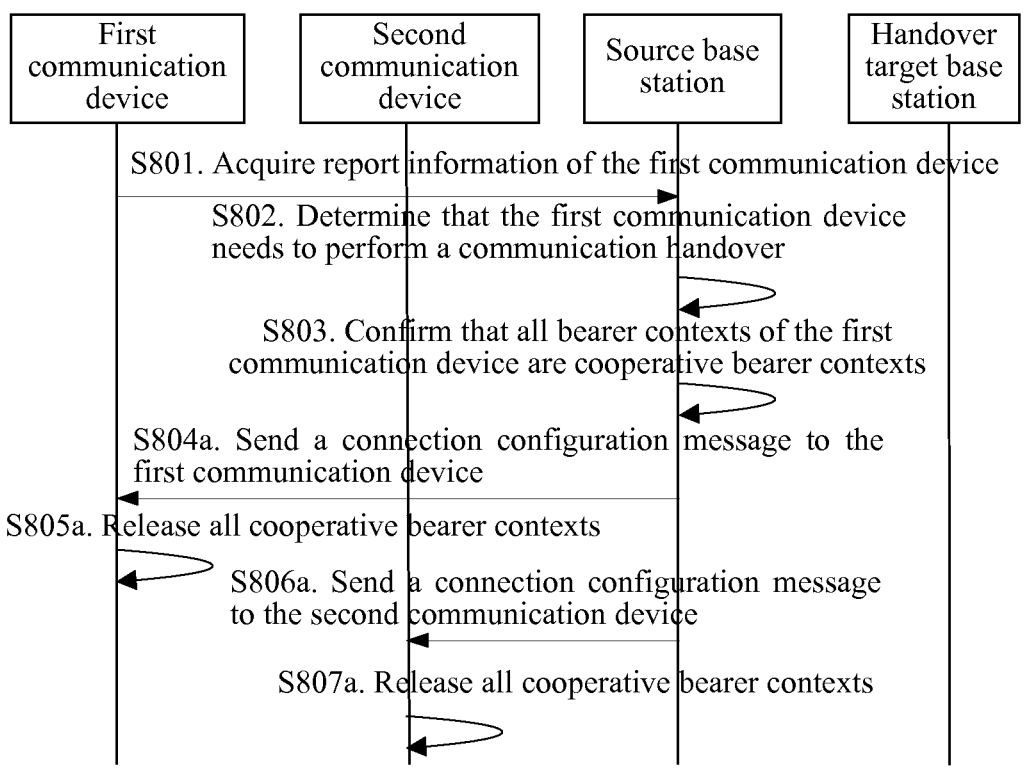
FIG. 8a and FIG. 8b are schematic flowcharts of a cooperative communication processing method according to another embodiment of the present invention.
Figure 8B:
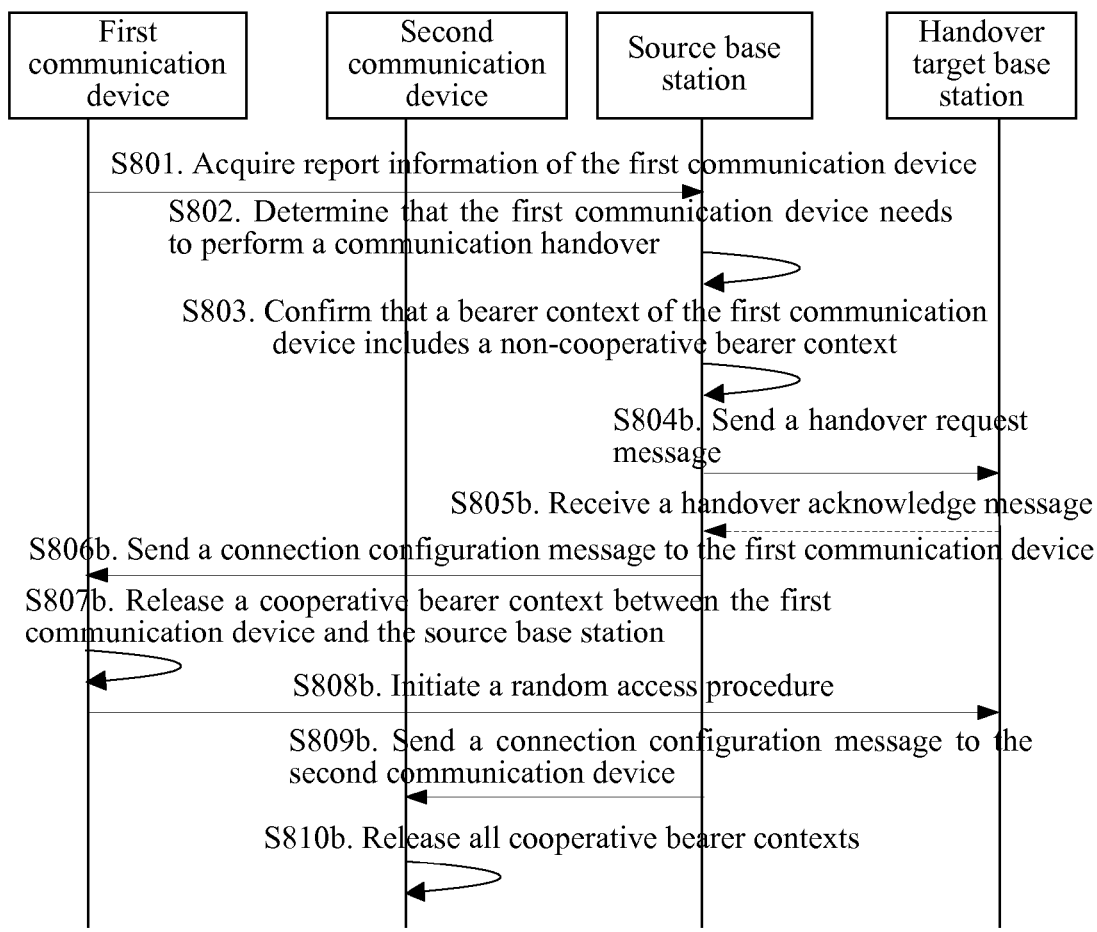

FIG. 8 is a schematic flowchart of a second embodiment of a cooperative communication processing method according to the present invention. As shown in the figure, the cooperative communication processing method in the second embodiment of the present invention includes:

S801 and S802 are the same as S701 and S702 in the first embodiment of the present invention, and are not further described herein.

S803. The source eNB determines whether all bearer contexts of the first communication device are cooperative bearer contexts. In this embodiment, the first communication device is a communication device that needs to perform a communication handover, and may be a supporting device or a benefited device. A cooperative communication device of the first communication device is a second communication device. If a determining result is yes, procedure A is executed, or if a determining result is no, procedure B is executed.

Procedure A includes S804 to S807.

S804. The source eNB sends a connection configuration message to the first communication device, to instruct the first communication device to release a cooperative bearer context between the first communication device and the source eNB and a cooperative bearer context between the first communication device and the second communication device. In this embodiment, the connection configuration message sent by the source eNB to the first communication device in S804 may be an RRC connection release message, to instruct the first communication device to release all bearer contexts.

S805. The first communication device releases all cooperative bearer contexts. According to the determining result in S803, the first communication device has no non-cooperative bearer context. Therefore, in this case, the first communication device may release all the bearer contexts.

S806. The source eNB sends a connection configuration message to the second communication device, so that the second communication device releases the cooperative bearer context between the second communication device and the first communication device and a cooperative bearer context between the second communication device and the source eNB. Optionally, the source eNB may perform cooperative communication pairing for the second communication device again after sending the connection configuration message to the second communication device. It should be pointed out that, there is no limitation on a necessary logical time sequence between S806 and S804. An execution sequence of the two steps may be reversed, which does not affect implementation of this embodiment.

S807. The second communication device releases the cooperative bearer context between the second communication device and the first communication device and the cooperative bearer context between the second communication device and the source eNB.

Procedure B includes S808b to S814b.

S808b. The source eNB sends a handover request message to a handover target eNB of the first communication device, where the handover request message includes a first bearer context between the source eNB and the first communication device, and the first bearer context includes a non-cooperative bearer context between the source eNB and the first communication device, and further, in this embodiment, the handover request message may further include a cooperative bearer context between the source eNB and the first communication device, that is, all bearer contexts of the first communication device are handed over to the handover target eNB.

S809b. The source eNB receives a handover acknowledge message from the handover target eNB of the first communication device, where the handover acknowledge message includes a second bearer context that is allocated to the first communication device according to the first bearer context by the handover target eNB of the first communication device. The second bearer context is corresponding to the bearer context that is allocated to the first communication device by the source eNB. The handover target eNB allocates the second bearer context to the first communication device, so that the first communication device may smoothly complete a handover process between communication eNBs. Specifically, after receiving the handover request message sent by the source eNB, the handover target eNB of the first communication device allocates the corresponding second bearer context to the first communication device according to the first bearer context of the first communication device that is carried in the handover request message. That is, if the handover request message carries only the non-cooperative bearer context between the source eNB and the first communication device, the handover target eNB of the first communication device also allocates only a corresponding non-cooperative bearer context to the first communication device.

S810b. The source eNB sends a connection configuration message to the first communication device. The connection configuration message sent to the first communication device in S810b carries the second bearer context that is allocated to the first communication device by the handover target eNB, to instruct the first communication device to release all cooperative bearer contexts and instruct the first communication device to initiate a random access procedure to the handover target eNB according to the second bearer context that is allocated to the first communication device by the handover target eNB.

S811b. The first communication device releases all the cooperative bearer contexts.

S812b. The first communication device initiates the random access procedure to the handover target eNB. Specifically, the first communication device may initiate the random access procedure to the handover target eNB according to the second bearer context, which is allocated to the first communication device by the handover target eNB, in the connection configuration message delivered by the source eNB in S810b.

S813b. The source eNB sends a connection configuration message to the second communication device, so that the second communication device releases a cooperative bearer context between the second communication device and the first communication device and a cooperative bearer context between the second communication device and the source eNB. Optionally, the source eNB may perform cooperative communication pairing for the second communication device again after sending the connection configuration message to the second communication device. It should be pointed out that, there is no limitation on a necessary logical time sequence between S811b and S813b. An execution sequence of the two steps may be reversed, which does not affect implementation of this embodiment.

S814b. The second communication device releases the cooperative bearer context between the second communication device and the first communication device and the cooperative bearer context between the second communication device and the source eNB.

Figure 9A:
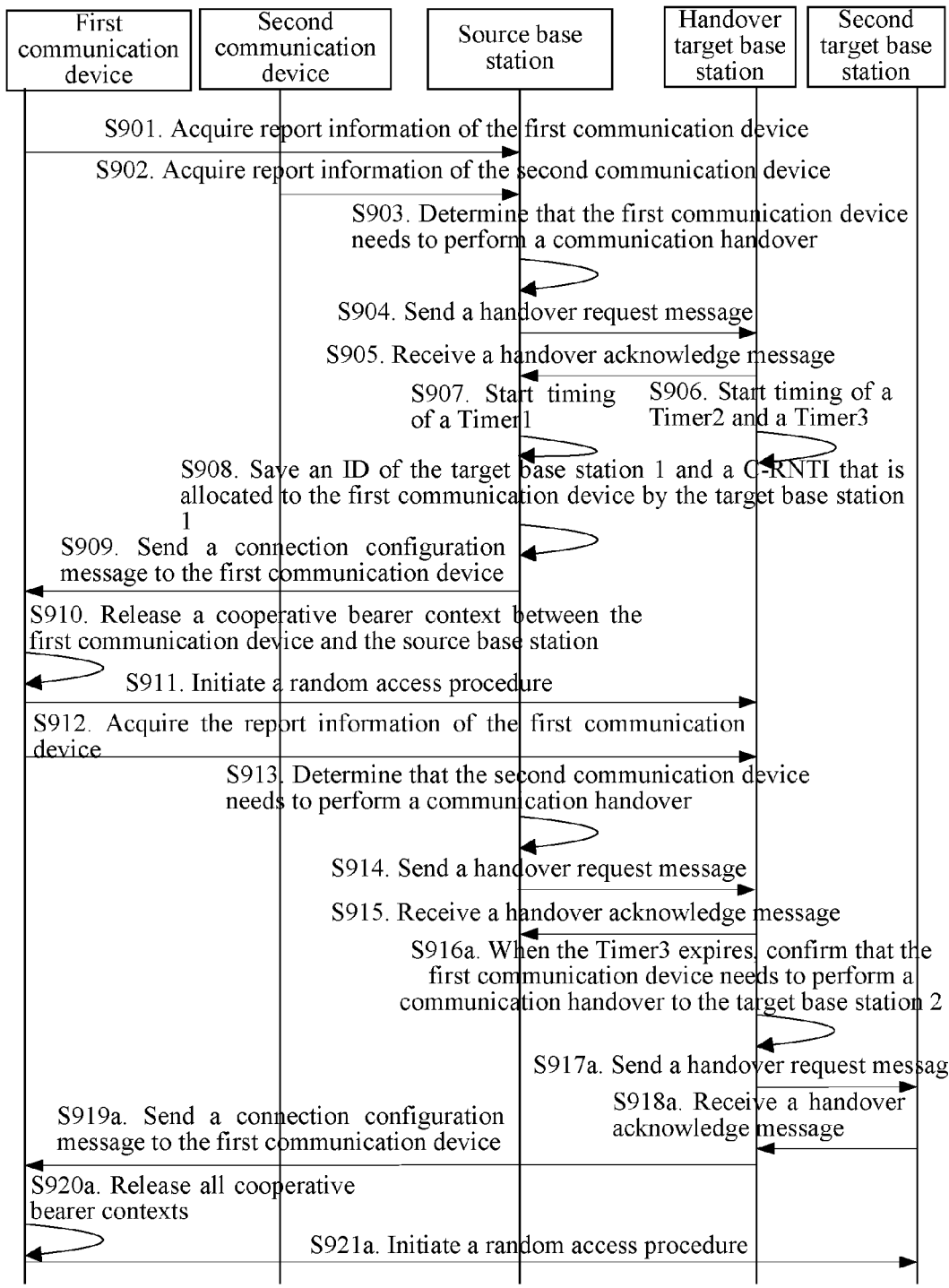
FIG. 9a to FIG. 9c are schematic flowcharts of a cooperative communication processing method according to another embodiment of the present invention.
Figure 9B:
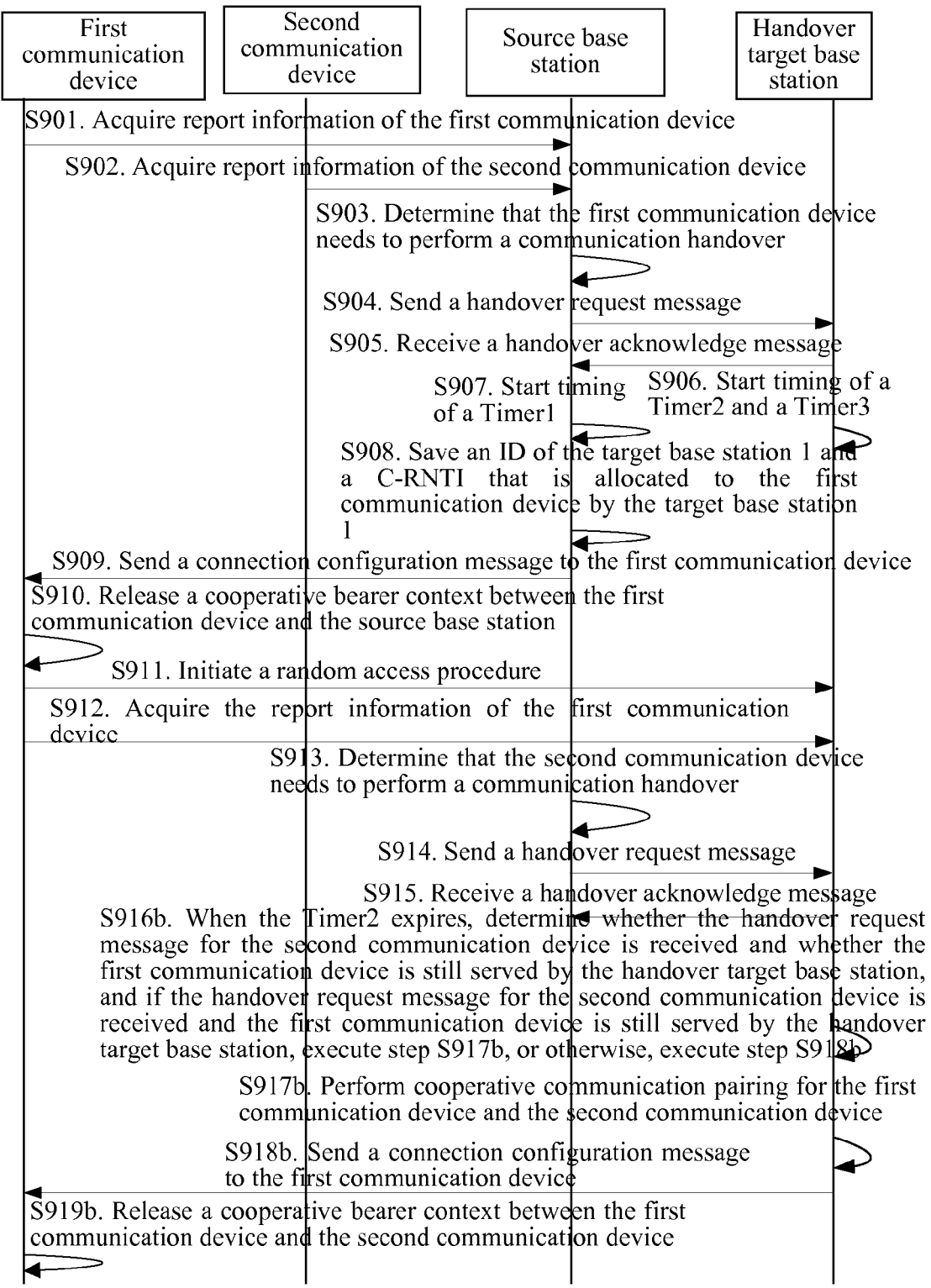
Figure 9C:
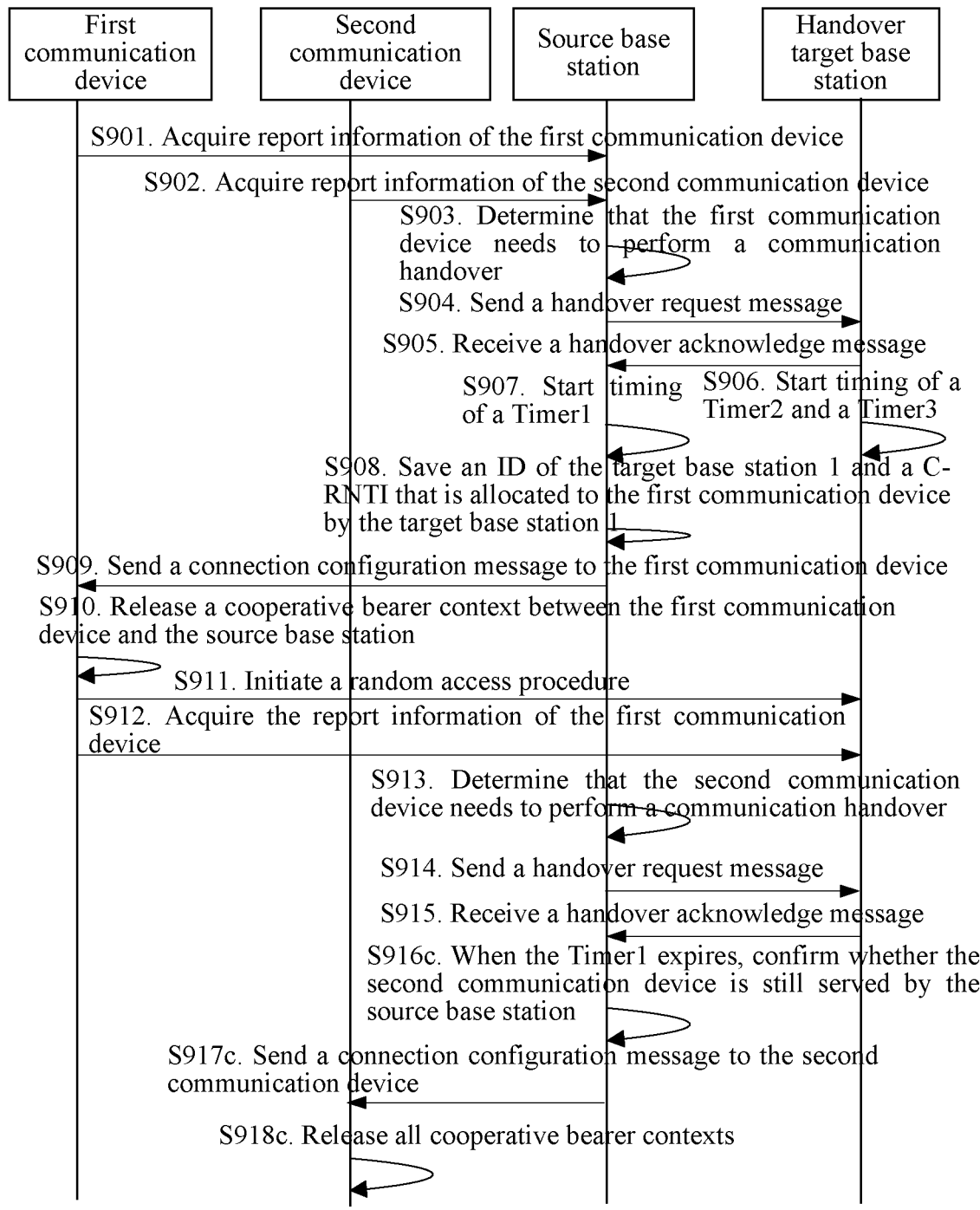

FIG. 9 is a schematic flowchart of a third embodiment of a cooperative communication processing method according to the present invention. As shown in the figure, the cooperative communication processing method in the third embodiment includes:

S901. A source eNB acquires report information of a first communication device. The report information may include but is not limited to information such as signal quality or strength of a current cell in which the first communication device is located and signal quality or strength of a neighboring cell. The first communication device and a second communication device are mutually cooperative communication devices. The first communication device is a communication device that first needs to perform a communication handover in this embodiment, and may be a supporting device or a benefited device. When the first communication device is a supporting device, a cooperative communication device of the first communication device, that is, the second communication device, is a benefited device. When the second communication device is a benefited device, a cooperative communication device of the second communication device, that is, the second communication device, is a supporting device.

S902. The source eNB acquires report information of the second communication device. The report information may include information such as signal quality or strength of a current cell in which the second communication device is located and signal quality or strength of a neighboring cell. In specific implementation, S901 and S902 may be performed simultaneously.

S903. The source eNB determines, according to the report information of the first communication device, whether the first communication device needs to perform a communication handover, and if the first communication device needs to perform the communication handover, executes S904. In specific implementation, according to the report information of the first communication device that is acquired in S901 and indicates, for example, that the signal quality or strength of the current cell in which the first communication device is located is less than a threshold, or is poorer than that of the neighboring cell, and that a difference exceeds a threshold, the source eNB may confirm that the first communication device needs to perform the communication handover, and then executes S904.

S904. The source eNB sends a handover request message to a handover target eNB of the first communication device, where the handover request message includes a first bearer context between the source eNB and the first communication device. In this embodiment, the first bearer context between the source eNB and the first communication device in the handover request message sent by the source eNB to the handover target eNB of the first communication device includes a cooperative bearer context and a non-cooperative bearer context, that is, all bearer contexts between the source eNB and the first communication device are handed over to the handover target eNB.

S905. The source eNB receives a handover acknowledge message from the handover target eNB of the first communication device, where the handover acknowledge message includes a second bearer context that is allocated to the first communication device by the handover target eNB of the first communication device. Specifically, after receiving the handover request message sent by the source eNB, the handover target eNB of the first communication device allocates the corresponding second bearer context to the first communication device according to the first bearer context of the first communication device that is carried in the handover request message, and then returns the handover acknowledge message carrying the second bearer context that is allocated to the first communication device.

S906. After sending the handover acknowledge message to the source eNB, the handover target eNB starts to star Timer2 and a Timer3, where a second time interval preset in the Timer2 is a time period for reserving a cooperative communication relationship between the first communication device and the second communication device by the handover target eNB, and a third time interval preset in the Timer3 is a time period for detecting, by the handover target eNB, whether the first communication device performs a second handover in a short time.

S907. After receiving the handover acknowledge message sent by the handover target eNB, the source eNB starts timing of a Timer1, where a first time interval preset in the Timer1 is a time period for reserving a cooperative bearer context of the second communication device by the source eNB.

S908. The source eNB saves, in a bearer context between the source eNB and the second communication device, a eNB identifier of the handover target eNB of the first communication device and a radio network temporary identifier that is allocated to the first communication device by the handover target eNB of the first communication device. Specifically, after receiving the handover acknowledge message sent by the handover target eNB of the first communication device, the source eNB saves, in the bearer context between the source eNB and the second communication device, the eNB identifier of the handover target eNB of the first communication device and the radio network temporary identifier that is allocated to the first communication device by the handover target eNB of the first communication device.

S909. The source eNB sends a connection configuration message to the first communication device. In this embodiment, the connection configuration message sent by the source eNB to the first communication device in S909 may be an RRC connection reconfiguration message. The connection configuration message carries the second bearer context that is allocated to the first communication device by the handover target eNB, to instruct the first communication device to release a cooperative bearer context between the first communication device and the source eNB and instruct the first communication device to initiate a random access procedure to the handover target eNB according to the second bearer context that is allocated to the first communication device by the handover target eNB.

S910. The first communication device releases the cooperative bearer context between the first communication device and the source eNB according to the received connection configuration message.

S911. The first communication device initiates the random access procedure to the handover target eNB according to the second bearer context, which is allocated to the first communication device by the handover target eNB, in the received connection configuration message.

S912. The handover target eNB acquires the report information of the first communication device. In specific implementation, after receiving the connection configuration message, the first communication device initiates the random access procedure to the handover target eNB, and then the handover target eNB can acquire the report information of the first communication device, where the report information may include the information such as the signal strength and quality of the current cell in which the first communication device is located and the signal strength and quality of the neighboring cell.

S913. The source eNB determines, according to the report information of the second communication device, whether the second communication device needs to perform a communication handover, and if the second communication device needs to perform the communication handover, executes S914. Being similar to S903, the source eNB determines, according to the report information of the second communication device that is acquired in S901, whether the second communication device needs to perform the communication handover. For example, if the signal quality or strength of the current cell in which the second communication device is located is less than a threshold, or is poorer than that of the neighboring cell, and a difference exceeds a threshold, it may be confirmed that the second communication device needs to perform the communication handover. In this embodiment, a handover target eNB of the second communication device is the same as the handover target eNB of the first communication device, that is, after the first communication device is handed over to the handover target eNB, the second communication device is also handed over to the same target eNB.

S914. The source eNB sends a handover request message to the handover target eNB of the second communication device, where the handover request message for the second communication device may include the bearer context between the source eNB and the second communication device, and further include the eNB identifier of the handover target eNB of the first communication device and the radio network temporary identifier that is allocated to the first communication device by the handover target eNB of the first communication device, where the eNB identifier and the radio network temporary identifier are saved in the bearer context between the source eNB and the second communication device by the source eNB in step S908.

S915. The source eNB receives a handover acknowledge message from the handover target eNB of the second communication device, where the handover acknowledge message includes a bearer context that is allocated to the second communication device by the handover target eNB of the second communication device, a eNB identifier of the handover target eNB of the second communication device, and a radio network temporary identifier that is allocated to the second communication device by the handover target eNB of the second communication device. Specifically, after receiving the handover request message sent by the source eNB, the handover target eNB of the second communication device allocates the corresponding bearer context to the second communication device according to the bearer context between the source eNB and the second communication device that is carried in the handover request message, and further allocates the radio network temporary identifier to the second communication device, and returns, to the source eNB, the handover acknowledge message carrying the radio network temporary identifier.

S916a. When the Timer3 expires, that is, after the handover target eNB sends the handover acknowledge message to the source eNB, when the third time interval expires, the handover target eNB confirms, according to the report information of the first communication device, that the first communication device needs to perform a communication handover to the second target eNB, that is, determines a handover target eNB to which the first communication device will perform a second handover.

S917a. When the Timer3 expires, after it is determined that the first communication device needs to perform the communication handover to the second target eNB, the handover target eNB sends a handover request message to the second target eNB, where the handover request message includes a non-cooperative bearer context between the handover target eNB and the first communication device, only the non-cooperative bearer context of the first communication device is handed over to the second target base station.

S918a. The handover target eNB acquires a handover acknowledge message from the second target eNB, where the handover acknowledge message carries a bearer context that is allocated to the first communication device by the second target eNB.

S919a. The handover target eNB sends a connection configuration message to the first communication device according to the handover acknowledge message acquired from the second target eNB, where the connection configuration message carries the bearer context that is allocated to the first communication device by the second target eNB.

S920a. The first communication device releases all cooperative bearer contexts.

S921a. The first communication device initiates a random access procedure to the second target eNB according to the bearer context, which is allocated to the first communication device by the second target eNB, in the connection configuration message acquired from the handover target eNB.

S916b. When the Timer2 expires, that is, after the handover target eNB sends the handover acknowledge message for the first communication device to the source eNB, when the second time interval expires, the handover target eNB determines whether the handover request message for the second communication device is received and whether the first communication device is still served by the handover target eNB, where the handover request message for the second communication device includes the bearer context between the source eNB and the second communication device, the eNB identifier of the handover target eNB, and the radio network temporary identifier that is allocated to the first communication device. Specifically, the second time interval is a time period for reserving a cooperative bearer context between the first communication device and the second communication device by the handover target eNB. When the handover target eNB receives, in the second time interval, the handover request message including the eNB identifier of the handover target eNB and the radio network temporary identifier that is allocated to the first communication device, and the first communication device is still served by the handover target eNB when the second time interval expires, a positive determining result may be obtained in step S916b, and execution of S917b is triggered; otherwise, step S918b is executed. It should be pointed out that, there is no limitation on a necessary logical time sequence between S916b and S916a. An execution sequence of the two steps may be reversed, which does not affect implementation of the present invention.

S917b. When a determining result obtained in step S916b is yes, the handover target eNB performs cooperative communication pairing for the first communication device and the second communication device according to the radio network temporary identifier, which is allocated to the first communication device, in the handover request message for the second communication device.

S918b. When the determining result obtained in step S916b is no, the handover target eNB sends a connection configuration message to the first communication device, so that the first communication device releases all cooperative bearer contexts.

S919b. The first communication device releases all the cooperative bearer contexts according to the received connection configuration message.

S916c. When the Timer1 expires, that is, after the source eNB receives the handover acknowledge message from the handover target eNB of the first communication device, when the first time interval expires, the source eNB determines whether the second communication device is still served by the source eNB.

S917c. When a determining result obtained in S916c is yes, the source eNB sends a connection configuration message to the second communication device, so that the second communication device releases a cooperative bearer context between the second communication device and the first communication device and a cooperative bearer context between the second communication device and the source eNB. The connection configuration message herein may be an RRC connection configuration message. Further, optionally, after sending the connection configuration message to the second communication device, the source eNB may perform cooperative communication pairing for the second communication device again.

S918c. The second communication device releases the cooperative bearer context between the second communication device and the first communication device and the cooperative bearer context between the second communication device and the source eNB according to the received connection configuration message.

According to the present invention, when a source eNB determines that either one of cooperative communication devices needs to perform a communication handover, the source eNB sends a connection configuration message to each of two devices, so that the two devices release a cooperative bearer context. Further, a reserving time period is set at the source eNB and a handover target eNB. Therefore, release or maintenance processing of a cooperative communication relationship between cooperative communication devices in a communication handover process can be implemented.

A person of ordinary skill in the art may understand that all or a part of the procedures of the methods in the foregoing embodiments may be implemented by a computer program instructing relevant hardware. The program may be stored in a computer readable storage medium. When the program runs, the procedures of the methods in the foregoing embodiments are performed. The storage medium may include: a magnetic disk, an optical disc, a read-only memory (Read-Only Memory, ROM), or a random access memory (Random Access Memory, RAM).

Only exemplary embodiments of the present invention are disclosed above, and certainly are not intended to limit the scope of claims of the present invention. A person of ordinary skill in the art may understand that, all or some procedures for implementing the foregoing embodiments and equivalent variations made according to the claims of the present invention shall also fall within the scope of the present invention.

What is claimed is:

1. A cooperative communication processing method, wherein the method comprises:
   acquiring report information of a first communication device, wherein the first communication device is a supporting device or a benefited device; and
   if it is determined, according to the report information of the first communication device, that the first communication device needs to perform a handover, executing the following operations:
   sending a connection configuration message to the first communication device, so that the first communication device releases a cooperative bearer context between the first communication device and a source eNB;
   sending a connection configuration message to a second communication device, so that the second communication device releases a cooperative bearer context between the second communication device and the first communication device and a cooperative bearer context between the second communication device and the source eNB, wherein the second communication device is a cooperative communication device of the first communication device
   wherein after it is determined, according to the report information of the first communication device, that the first communication device needs to perform the handover, and before the sending a connection configuration message to the first communication device, the method further comprises:
   determining that all bearer contexts of the first communication device are cooperative bearer contexts.

2. The method according to claim 1, wherein before the sending a connection configuration message to the first communication device, the method further comprises:
   sending a handover request message to a handover target eNB of the first communication device, wherein the handover request message comprises a first bearer context between the source eNB and the first communication device, and the first bearer context comprises the cooperative bearer context and a non-cooperative bearer context between the source eNB and the first communication device; and
   receiving a handover acknowledge message from the handover target eNB of the first communication device, wherein the handover acknowledge message comprises a second bearer context that is allocated to the first communication device according to the first bearer context by the handover target eNB of the first communication device; and
   the sending a connection configuration message to the first communication device comprises:
   sending the connection configuration message to the first communication device, wherein the connection configuration message carries the second bearer context that is allocated to the first communication device by the handover target eNB of the first communication device, so that the first communication device initiates a random access procedure to the handover target eNB of the first communication device according to the second bearer context that is allocated to the first communication device by the handover target eNB of the first communication device.

3. A cooperative communication processing method, wherein the method comprises:
   acquiring report information of a first communication device, wherein the first communication device is a supporting device or a benefited device; and
   if it is determined, according to the report information of the first communication device, that the first communication device needs to perform a handover, executing the following operations:
   sending a connection configuration message to the first communication device, so that the first communication device releases a cooperative bearer context between the first communication device and a source eNB;
   sending a connection configuration message to a second communication device, so that the second communication device releases a cooperative bearer context between the second communication device and the first communication device and a cooperative bearer context between the second communication device and the source eNB, wherein the second communication device is a cooperative communication device of the first communication device,
   wherein after it is determined, according to the report information of the first communication device, that the first communication device needs to perform the handover, and before the sending a connection configuration message to the first communication device, the method further comprises:
   confirming that a bearer context of the first communication device comprises a non-cooperative bearer context;
   sending a handover request message to a handover target eNB of the first communication device, wherein the handover request message comprises a first bearer context between the source eNB and the first communication device, and the first bearer context comprises a non-cooperative bearer context between the source eNB and the first communication device; and
   receiving a handover request acknowledge message from the handover target eNB of the first communication device, wherein the handover acknowledge message comprises a second bearer context that is allocated to the first communication device according to the first bearer context by the handover target eNB of the first communication device; and
   the sending a connection configuration message to the first communication device comprises:
   sending the connection configuration message to the first communication device, wherein the connection configuration message carries the second bearer context that is allocated to the first communication device by the handover target eNB of the first communication device, so that the first communication device initiates a random access procedure to the handover target eNB of the first communication device according to the second bearer context that is allocated to the first communication device by the handover target eNB of the first communication device.

4. The method according to claim 3, wherein the first bearer context further comprises the cooperative bearer context between the source eNB and the first communication device.

5. The method according to claim 3, wherein before the sending a connection configuration message to a second communication device, the method further comprises:
  after the handover acknowledge message is received from the handover target eNB of the first communication device, when a first time interval reaches a threshold, confirming that the second communication device is still served by the source base station.

6. The method according to claim 3, wherein the handover acknowledge message further comprises a eNB identifier of the handover target eNB of the first communication device and a radio network temporary identifier that is allocated to the first communication device by the handover target eNB of the first communication device, and the method further comprises:
  saving, in the cooperative bearer context between the source eNB and the second communication device that is saved in the source eNB, the eNB identifier of the handover target eNB of the first communication device and the radio network temporary identifier that is allocated to the first communication device by the handover target eNB of the first communication device.

7. The method according to claim 6, wherein the method further comprises:
  acquiring report information of the second communication device;
  determining, according to the acquired report information of the second communication device, whether the second communication device needs to perform handover processing; and
  if the second communication device needs to perform the handover processing, sending a handover request message to a handover target eNB of the second communication device, wherein the handover request message comprises the bearer context between the source eNB and the second communication device, the eNB identifier of the handover target eNB of the first communication device, and the radio network temporary identifier that is allocated to the first communication device by the handover target eNB of the first communication device.

8. A source eNB for implementing cooperative communication processing, wherein the source eNB comprises:
  at least one memory configured to store at least one instruction; and
  at least one hardware processor configured to, including configured by the at least one instruction to: acquire report information of a first communication device, wherein the first communication device is a supporting device or a benefited device, and a cooperative communication device of the first communication device is a second communication device;
  determine, according to the acquired report information of the first communication device, whether the first communication device needs to perform a handover;
  send a connection configuration message to the first communication device when the first communication device is determined to need to perform the handover, so that the first communication device releases a cooperative bearer context between the first communication device and the source eNB;
  send a connection configuration message to the second communication device when the first communication device is determined to need to perform the handover, so that the second communication device releases a cooperative bearer context between the second communication device and the first communication device and a cooperative bearer context between the second communication device and the source eNB,
  wherein the at least one hardware processor is further configured to:
  confirm that all bearer contexts of the first communication device are cooperative bearer contexts, when the first communication device is determined to need to perform the handover.

9. The source eNB according to claim 8, wherein the at least one hardware processor is further configured to:
  send a handover request message to a handover target eNB of the first communication device, wherein the handover request message comprises a first bearer context between the source eNB and the first communication device, and the first bearer context comprises the cooperative bearer context and a non-cooperative bearer context between the source eNB and the first communication device;
  receive a handover acknowledge message from the handover target eNB of the first communication device, wherein the handover acknowledge message comprises a second bearer context that is allocated to the first communication device according to the first bearer context by the handover target eNB of the first communication device; and
  send the connection configuration message to the first communication device, wherein the connection configuration message carries the second bearer context that is allocated to the first communication device by the handover target eNB of the first communication device and received, so that the first communication device initiates a random access procedure to the handover target eNB of the first communication device according to the second bearer context that is allocated to the first communication device by the handover target eNB of the first communication device.

10. A source eNB for implementing cooperative communication processing, wherein the source eNB comprises:
  at least one memory configured to store at least one instruction; and
  at least one hardware processor configured to, including configured by the at least one instruction to: acquire report information of a first communication device, wherein the first communication device is a supporting device or a benefited device, and a cooperative communication device of the first communication device is a second communication
  device: determine, according to the acquired report information of the first communication device, whether the first communication device needs to perform a handover;
  send a connection configuration message to the first communication device when the first communication device is determined to need to perform the handover, so that the first communication device releases a cooperative bearer context between the first communication device and the source eNB;
  send a connection configuration message to the second communication device when the first communication device is determined to need to perform the handover, so that the second communication device releases a cooperative bearer context between the second communication device and the first communication device and a cooperative bearer context between the second communication device and the source eNB, wherein the at least one hardware processor is further configured to:

confirm that a bearer context of the first communication device comprises a non-cooperative bearer context, when the first communication device is determined to need to perform the handover;

send a handover request message to a handover target eNB of the first communication device when the bearer context of the first communication device is confirmed to comprise a non-cooperative bearer context, wherein the handover request message comprises a first bearer context between the source eNB and the first communication device, and the first bearer context comprises a non-cooperative bearer context between the source eNB and the first communication device;

receive a handover acknowledge message from the handover target eNB of the first communication device, wherein the handover acknowledge message comprises a second bearer context that is allocated to the first communication device according to the first bearer context by the handover target eNB of the first communication device; and when the bearer context of the first communication device is confirmed to comprise a non-cooperative bearer context, send the connection configuration message to the first communication device, wherein the connection configuration message carries the second bearer context that is allocated to the first communication device by the handover target eNB of the first communication device and received, so that the first communication device initiates a random access procedure to the handover target eNB of the first communication device according to the second bearer context that is allocated to the first communication device by the handover target eNB of the first communication device.

11. The source eNB according to claim 10, wherein the handover request message sent to the handover target eNB of the first communication device further comprises the cooperative bearer context between the source eNB and the first communication device.

12. The source eNB according to claim 10, wherein the at least one hardware processor is further configured to:

after the handover acknowledge message is received from the handover target eNB of the first communication device, when a first time interval reaches a threshold, determine whether the second communication device is still served by the source eNB, and if the second communication device is still served by the source eNB, send the connection configuration message to the second communication device.

13. he source eNB according to claim 10, wherein the received handover acknowledge message further comprises a eNB identifier of the handover target eNB of the first communication device and a radio network temporary identifier that is allocated to the first communication device by the handover target eNB of the first communication device, and the at least one hardware processor is further configured to:

save, in the bearer context between the source eNB and the second communication device that is saved in the source eNB, the eNB identifier of the handover target eNB of the first communication device and the radio network temporary identifier that is allocated to the first communication device by the handover target eNB of the first communication device.

* * * * *

UNITED STATES PATENT AND TRADEMARK OFFICE
CERTIFICATE OF CORRECTION

| | |
|---|---|
| PATENT NO. | : 9,717,026 B2 |
| APPLICATION NO. | : 14/695226 |
| DATED | : July 25, 2017 |
| INVENTOR(S) | : Fei Yang et al. |

It is certified that error appears in the above-identified patent and that said Letters Patent is hereby corrected as shown below:

In the Claims

Column 38, Line 19:
In Claim 13, delete "he" and insert -- The --, therefore.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*